June 2, 1942.  E. WILDHABER  2,285,133
CUTTER FOR AND METHOD OF CUTTING GEARS
Filed April 17, 1937  9 Sheets-Sheet 2
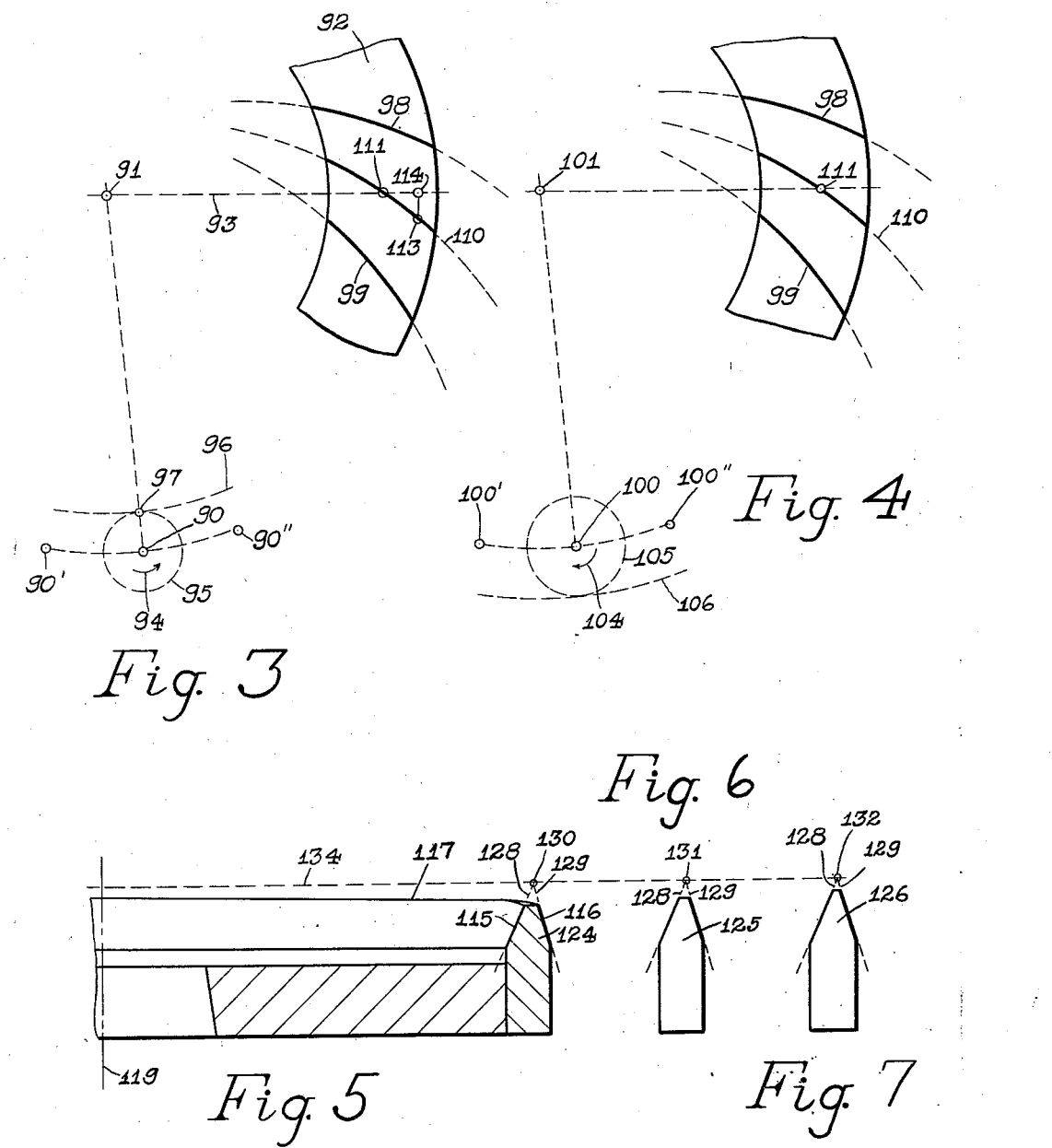
Ernest Wildhaber - Inventor
By B.E.Shlesinger
Attorney June 2, 1942. E. WILDHABER 2,285,133
CUTTER FOR AND METHOD OF CUTTING GEARS
Filed April 17, 1937 9 Sheets-Sheet 3
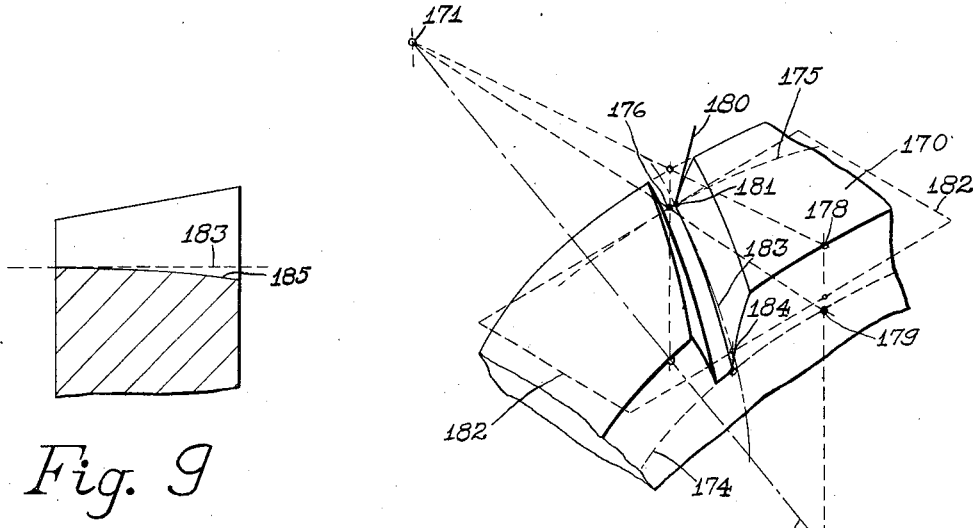
Fig. 9
Fig. 8
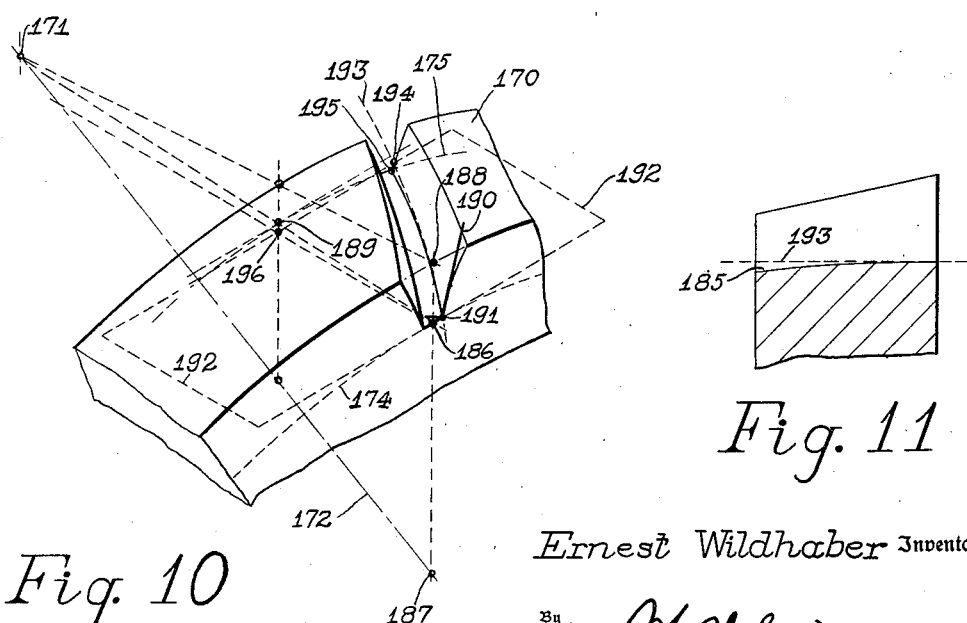
Fig. 10
Fig. 11
Ernest Wildhaber Inventor
By B. Ashlbeinger
Attorney June 2, 1942.  E. WILDHABER  2,285,133
CUTTER FOR AND METHOD OF CUTTING GEARS
Filed April 17, 1937   9 Sheets-Sheet 4

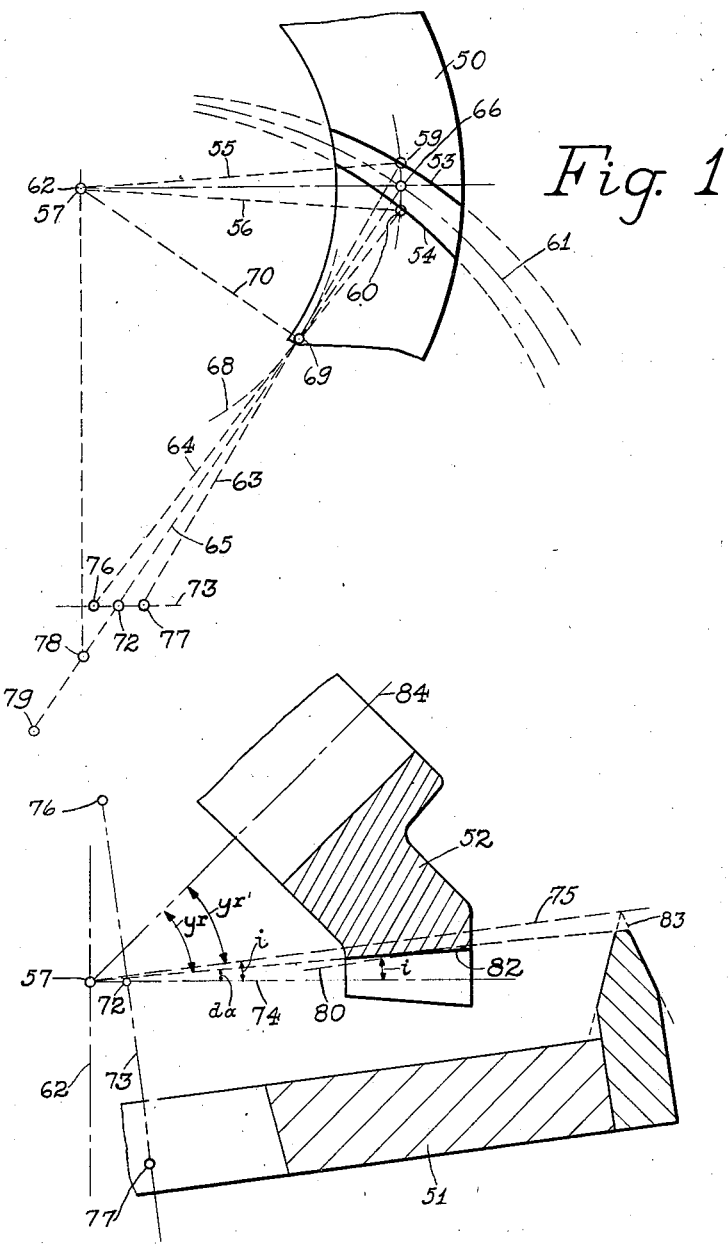

Ernest Wildhaber Inventor

By /s/ Attorney

June 2, 1942.   E. WILDHABER   2,285,133
CUTTER FOR AND METHOD OF CUTTING GEARS
Filed April 17, 1937   9 Sheets-Sheet 5

Ernest Wildhaber Inventor
By [signature]
Attorney

June 2, 1942.  E. WILDHABER  2,285,133
CUTTER FOR AND METHOD OF CUTTING GEARS
Filed April 17, 1937  9 Sheets-Sheet 6

Inventor
Ernest Wildhaber
By
Attorney

Inventor
Ernest Wildhaber
By
Attorney

June 2, 1942.    E. WILDHABER    2,285,133
CUTTER FOR AND METHOD OF CUTTING GEARS
Filed April 17, 1937    9 Sheets-Sheet 9

Ernest Wildhaber Inventor

By [signature]
Attorney

Patented June 2, 1942

2,285,133

UNITED STATES PATENT OFFICE 2,285,133

CUTTER FOR AND METHOD OF CUTTING GEARS

Ernest Wildhaber, Irondequoit, N. Y., assignor to Gleason Works, Rochester, N. Y., a corporation of New York Application April 17, 1937, Serial No. 137,531

42 Claims. (Cl. 90—5)

The present invention relates to the manufacture of gears and particularly to the production of longitudinally curved tooth tapered gears.

One object of the invention is to provide a method for completely generating one or more tooth sides of a gear or pinion in a single pass of a tool and in a single generating roll.

A further object of the invention is to provide a method for completely generating two tooth sides of a tapered gear in a single generating roll and in a single pass of a tool and in such way that the teeth of the gear will taper properly in depth and width from end to end.

To these ends, it is a further object of the invention to provide a method of generating a tapered gear or pinion in which the tool represents two or more tooth sides of a basic gear or crown gear and has a plurality of cutting edges lying in imaginary surfaces representing such tooth sides, and in which the cutting motion of the tool is timed with the generating roll in such manner that the cutting edges of the tool are coordinated with and adapted to cut at definite points along the generated tooth surfaces and in which the cutting profile or contour formed by a top and opposite side cutting edges of the tool may vary along said imaginary surfaces and be adapted to the portion of the gear tooth to which it is coordinated.

Another object of the invention is to provide a gear-cutting tool that has a plurality of cutting edges so arranged that successive cutting edges form a cutting portion of varying profile or contour which differs from the profile or contour of the tooth spaces of the gear to be cut.

A further object of the invention is to provide a gear cutting tool of the above character whose profile or contour has straight sides but changes in size along the imaginary cutting surface or thread.

Still another object of the invention is to provide a gear generating tool having a plurality of cutting edges arranged in an imaginary surface whose cutting profile differs from the profile of the gear teeth to be cut and changes along said imaginary surface and in which the number of cutting edges is large enough completely to form a tooth surface through generation or envelopment.

Still another object of the invention is to provide a cutting tool of this type which has a roughing portion arranged ahead of its finishing portion that has cutting edges which do not contact the generated tooth surface formed by the finish cutting edges.

Another object of the invention is to provide a method and tool for generating tapered gears in which the tool has cutting edges arranged in a surface of revolution or in a helicoidal surface about an axis and in which the tool is rotated on said axis so that the tool makes only one revolution during generation of a tooth surface or a plurality of tooth surfaces of the gear, and in which the blank is indexed once for each revolution of the tool.

A further object of the invention is to provide a tool of the "single-cycle" type for cutting tapered gears having a plurality of cutting edges arranged circularly part-way around its periphery with a gap between the last and first blades and in which the number of cutting edges is large enough to completely form a tooth surface of a gear blank with desired taper in depth by enveloping or generating cuts in one revolution of the tool.

A further object of the invention is to provide a tool of the character described by the use of which two sides of a tooth space of a longitudinally curved tooth tapered gear may be cut simultaneously without "bias bearing" and without the necessity for any correcting motion between cutter and blank.

Still another object of the invention is to provide an improved method and improved cutting apparatus for rough-cutting spiral bevel and hypoid pinions to provide roughed-out tooth slots which will taper in width and depth from end to end.

A still further object of the invention is to provide an improved method and tool for shaving tapered gears.

Still further objects of the invention will appear hereinafter from the specification and from the recital of the appended claims.

Fig. 1 is a diagrammatic view, showing a crown gear fragmentarily and illustrating diagrammatically the conditions to be fulfilled in order to cut simultaneously two sides of a tooth space of a longitudinally curved tooth gear or pinion with the correct tooth taper;

Fig. 2 is a fragmentary sectional view showing a face-mill gear cutter in operative relation with a tapered gear blank and further illustrating the principles upon which the present invention is based;

Figs. 3 and 4 are diagrammatic views showing fragmentary developments of a spiral bevel or hypoid gear and illustrating two different methods of timing the rotation of the cutting tool to the generating roll during generation of a tooth space of such a gear by the method of the present invention;

Fig. 5 is a fragmentary sectional view, illustrating more or less diagrammatically the construction of a face-mill gear cutter built according to one modification of this invention and showing in section the blade of the cutter which is adapted to cut at the large end of the tooth space of a tapered gear;

Figs. 6 and 7 are views of the blades of this cutter which are adapted to cut at the middle of the tooth space and at the small end of the tooth space, respectively;

Figs. 8 and 9 are a fragmentary perspective view of a longitudinally curved tooth gear and a section taken lengthwise of the tooth space of this gear, respectively, illustrating why the blade of the cutter, which cuts at the small end of the tooth, will clear the large end of the tooth space and not affect the finished shape of the tooth space at its large end;

Figs. 10 and 11 are views corresponding to Figs. 8 and 9, respectively, and showing the position of the gear at a further point in the generating roll and illustrating why the blade of the cutter which cuts at the large end of the tooth space will clear the small end of the tooth space and not affect the finished shape of the small end of the tooth space;

Figure 40:
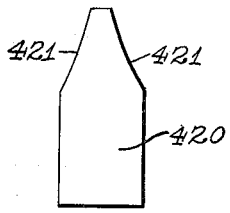
Figure 41:
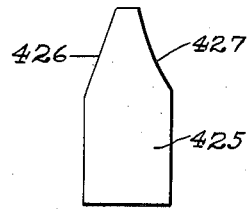
Figure 42:
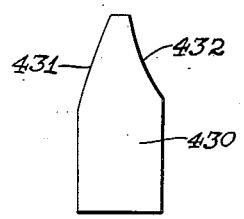

Figs. 40 to 42 inclusive are views illustrating further possible modifications of the invention and showing various profile shapes which may be used upon blades of cutters constructed according to the invention.

In the present invention a tool is used which has a plurality of cutting edges, each of which is constructed to operate at a definite point along the length of a tooth surface of a gear. The cutter is intended to cut the whole length of the tooth surface in a single pass through a tooth space. For a tapered gear, then, there will be one blade of the cutter which will cut at the large end of the gear tooth and another blade which will cut at the small end of the tooth and between these blades, there will be blades to cut at all intermediate points along the length of the tooth. The method is adapted for the production only of gears which have longitudinally inclined teeth and in a generating or enveloping operation. The blade which is adapted to cut at the large end of the tooth clears the small end of the tooth and vice-versa because of the longitudinal inclination of the teeth being cut and of the generating roll or enveloping action of the cutter in the cutting of the tooth surfaces of the blank. For finish-cutting, a sufficiently large number of blades are provided in the cutter to generate tooth surfaces of the required smoothness of finish.

For cutting spiral bevel and hypoid gears, a cutter of the "single cycle" type is preferably employed. Such a cutter has a plurality of cutting blades arranged circularly part-way around its periphery with a gap between the last and first blades. When constructed according to the present invention, the blades of the cutter vary in shape around the periphery of the cutter, each blade being adapted, as above indicated, to cut at some particular point along the length of a tooth of the gear. In the cutting operation, the cutter is rotated in engagement with the blank while a relative rolling movement is produced between the cutter and blank. In one embodiment of the invention, the cutter cuts only during roll in one direction and the blank is indexed and the return roll takes place while the gap in the cutter is abreast of the blank. In another embodiment of the invention, the cutter is designed so that it will cut during both the forward and return rolls and the blank is indexed when the tooth surface or tooth surfaces have been cut and the gap in the cutter is abreast of the blank.

Cutters made according to the invention ordinarily follow usual practice in that the cutting blades have all the same pressure angle. The variation in point-width required between the blades that are adapted to cut at different points along the length of a tooth may be obtained, however, in various ways. In one embodiment of the invention, the blades are so made that opposite sides of the blades converge in points which lie on a circle lying in a plane perpendicular to the axis of the cutter and the variation in height of the different blades produces the variation in point-width.

In longitudinally curved tooth tapered gears having teeth which taper in height from end to end, however, a "bias bearing" condition is ordinarily encountered, namely, a bearing or tooth surface contact which extends diagonally of the tooth surface from end to end thereof. This bearing condition is objectionable and various means have been employed to eliminate it and to produce a bearing which will extend parallel or approximately parallel to the pitch line of a pair of mating gears. One method that has been proposed for elimination of "bias bearing" is to impart to the cutter a helical motion during generation, that is, to feed the cutter axially relative to the gear blank as the cutter rotates on its axis during the generating roll. Such an axial motion makes for additional complication, however, in the design and construction of the gear-cutting machine.

It is possible to eliminate this "bias bearing" condition very simply with the present invention by use of a cutter designed according to one embodiment of the invention and no additional machine motion is required. Instead of making the blades of the cutter so that their sides intersect in points which lie in a common plane perpendicular to the axis of the cutter, the cutter is made with blades whose side surfaces intersect in points which lie on a helix described about the axis of the cutter. The blades have varying heights, as before, and are adapted to cut at different points along the length of a tooth, but in addition have the described helical arrangement of the points of intersection of their side cutting edges so that as the cutter is rotated in engagement with the gear blank during the generating roll, successive blades have in effect a displacement relative to the gear blank as though the cutter made according to the first described embodiment of this invention were being displaced axially during its rotation. In other words, the helical motion heretofore proposed for elimination as "bias bearing" is actually built into the cutter.

To obtain proper conjugacy between two members of a pair of tapered gears whose tooth surfaces are cut two sides simultaneously, it is proposed in one modification of the present invention to cut one member of the pair with a female tool which is complementary to the male tool used in the cutting of the other member of the pair. As with the prior described embodiments of the invention, it is preferred to make this female tool of the "single cycle" type. The female cutter may be employed either in a generating operation where the tool represents a tooth space of a crown gear or other basic gear to which the blank is to be generated conjugate or in a generating operation in which the tool represents a tooth space of the gear with which the gear being cut is to mate. The blades of the female cutters like the blades of tools made according to previously mentioned embodiments of the present invention vary in shape around the cutter. The blades may be made all of the same point-width or of varying point-width.

It will be obvious that the invention is not limited to the cutting of gears, but may also be employed in the shaving, lapping or burnishing of gears. Thus, instead of a tool having a plurality of relieved cutting edges such as is employed in a cutting operation, a tool having a plurality of unrelieved cutting edges may be substituted and used to shave a gear whose tooth surfaces have previously been cut to approximately finished size and shape. A shaving tool made according to the present invention, like the cutting tools already described, has different cutting edges which are adapted to shave at different points along the length of a tooth surface of the gear being shaved. The shaving tool, like the cutting tool, is also preferably provided with cutting edges only part-way around its periphery and there is a gap between the last and first edge to permit of indexing the gear when the gap in the tool is abreast of the gear.

Shaving tools constructed according to the present invention are adapted to operate in a generating or enveloping process and a tooth surface or a pair of tooth surfaces of a gear will be completely shaved after a complete pass of the shaving tool through a tooth space of the gear.

The invention is not restricted to the finish-cutting of gears, but may be employed with advantage for rough-cutting gears also where the blank and cutter are rolled relative to one another during the roughing operation. Through use of cutters constructed according to the present invention, a gear can be roughed out with tooth slots tapering in depth and width from end to end and hence a gear can be roughed closer to finished tooth depth. The application of the present invention to the rough-cutting of gears is described specifically in a separate application, Serial No. 279,523, filed June 16, 1939, which is a continuation in part of the present application. The present application is intended to cover the invention broadly and more specifically, the finishing of gears either from the solid or from a previously roughed gear blank.

The cutters employed for the present invention may have either straight side cutting edges or cutting edges of curved profile and if a profile curvature is used, this may be of any suitable character.

Reference will now be had to the drawings for a more detailed description of the invention.

The invention is particularly useful for simultaneously forming two or more tooth sides of a gear or pinion. We shall first derive, therefore, the relationships or conditions to be fulfilled for simultaneously cutting two sides of a pinion or gear with correct tooth taper.

In Fig. 1, a crown gear 50 is shown and in Fig. 2 there is illustrated a face-mill gear cutter 51 in engagement with a gear blank 52 which is to be generated conjugate to such a crown gear. The cutter in its operation is to represent two tooth sides of the crown gear and is intended to generate simultaneously two tooth surfaces on the gear 52 which will be conjugate to the tooth surfaces of the crown gear 50.

In order that a cutter 51 may represent simultaneously two tooth sides of the crown gear of natural tooth taper, the two tooth sides 53 and 54 of the crown gear should have the same spiral angle at the pitch surface of the crown gear, that is, the tooth sides should be equally inclined to radii 55 and 56, respectively, drawn from the apex 57 of the crown gear to mean points 59 and 60, respectively, at equal distances from the apex 57. In other words, the two pitch-line elements of the tooth surfaces 53 and 54 should be obtainable by simply rotating a mean pitch line element 61 first in one direction and then in the other about the crown gear axis 62.

If the gear which is to mate with the gear 52 is also generated conjugate to a crown gear which fulfills the above requirements and which is complementary to the crown gear 50, the gear 52 and its mate will mesh correctly with one another.

Like the pitch-line elements of the tooth surfaces 53 and 54, the normals 63 and 64, respectively, to the pitch-line elements may be obtained by turning the normal 65 at mean point 66 of pitch-line element 61 about the crown gear axis 62. It is therefore evident that all three normals 63, 64 and 65 have the same distance from the crown gear axis 62 and from crown gear apex 57 and are tangent to a circle 68 concentric with the crown gear apex.

The normals 63 and 64 intersect at a point 69 which lies on a line 70 drawn from the crown gear apex 57 perpendicular to the projected mean normal 65.

Let A be the mean cone distance, that is, the distance 57—66; let $r$ be the mean cutter radius, which is substantially equal to the distance 66—72, 72 being the point of intersection of the cutter axis 73 with the pitch plane 74 (Fig. 2) of the crown gear, which plane is, of course, perpendicular to the crown gear axis 62. Let $\psi$ denote the spiral angle of the tooth surfaces of the crown gear at the mean point 66 and let $\phi$ denote the pressure angle of the tooth surfaces of the crown gear, that is, the inclination of the actual tooth normals 63 and 64 in space with respect to the pitch plane 74 of the crown gear.

In order that the face-mill cutter 51 may embody two tooth surfaces 53 and 54 of the crown gear simultaneously, it is necessary that the cutter axis 73 should be so inclined to the pitch plane 74 of the crown gear that it passes through tooth normal 64 as well as tooth normal 63. The cutter axis 73 intersects tooth normal 64 in a point 76 and it intersects tooth normal 63 in a point 77.

We shall now determine the inclination $i$ of the cutter axis 73 with respect to the crown gear axis 62.

The vertical distance, in the direction of the crown gear axis 62 of the points 76 and 77 from one another is $2r \tan \phi$. The horizontal distance, that is, the projected distance 76—77 in Fig. 1 very closely approximates $$\frac{\text{distance } 69-72}{\cos \psi} \cdot \text{arc angle } (76-69-77)$$

distance $69-72 = r - A \sin \psi$ angle $76-69-77 =$ tooth angle $59-57-60$ arc $59-57-60 = \dfrac{1}{2A}$ (circular pitch at cone distance A)

$$= \frac{\pi}{2A.P}$$

where P is equal to the diametral pitch at A. Hence:

$$\tan i = \frac{r - A \sin \psi}{2r . \tan \phi . \cos \psi} \cdot \frac{\pi}{2A.P}$$

$$= \left(1 - \frac{A}{r} \sin \psi\right) \frac{\pi}{4A.P \tan \phi \sin \psi} \quad (1)$$

In the Gleason system of spiral bevel gears, the dedendum of a miter gear or the average dedendum $$b_a = \frac{1.038}{P}$$

and the dedendum angle $d_a$ is obtained from the formula $$\tan d_a = \frac{b_a}{A} = \frac{1.038}{A.P}$$

Formula (1) is applicable broadly to face-mill gear cutters of the conventional type as well as to face-mill gear cutters of the "single cycle" type. The face-mill cutter should be positioned relative to the gear 52 to be cut, whose axis is at 84, so that the line 75 containing the points of convergence on its side cutting edges will be inclined to the pitch plane 74 of the crown gear at the angle $i$ (Fig. 2). When the conventional face-mill 51 is positioned, however, so that it includes the said angle $i$ with relation to the pitch plane 74 of the crown gear, it will not cut the desired dedendum angle on the gear 52, but is bound to cut a tooth bottom along dotted line 80 which is inclined at angle $i$ to the pitch plane 74. This arrangement, however, results in an excessive tooth height at the large end of the tooth and in a subnormal tooth height at the toe or small end of the tooth.

This undesirable condition is overcome with the present invention for the desired standard tooth proportions and the desired root line 82, which is inclined to the pitch plane 74 at the standard dedendum angle $d_a$, may be obtained with a "single cycle" cutter constructed according to the present invention each of whose finish-cutting edges is arranged to cut only one portion of the tooth space of the gear blank.

One cutting edge cuts the root portion of the tooth space at the toe or small end only. Another cutting edge, possibly a quarter of a turn from the first named cutting edge, cuts the root portion at the center only. Still another blade cuts the root portion of the gear blank at the large end of the tooth only. For this reason, the blades or cutting teeth of the cutter may be made of varying height so that the desired root line 82 may be cut all along the length of the tooth. One cutting blade in the cutter is made just high enough to cut the desired depth at the toe or small end of the tooth. The height of the middle cutting blade is made to fit the height of the tooth surface at the middle portion of the length of the tooth, and the cutting blade which is adapted to form the root portion at the heel or large end of the tooth is made just high enough to cut the desired depth at that point.

The heights of intermediate blades change gradually, of course.

The opposite side-cutting edges of the cutter are preferably made straight and preferably will be made with positive pressure angles so that when prolonged, the opposite side-cutting edges intersect in a point and form an inverted V. This V-shape 83 is constant for all the finishing blades, that is, for all blades of the cutter which have contact with and cut the finished tooth surfaces. In this respect, the blades of a cutter made according to the present invention are the same as for a conventional face-mill gear cutter. However, in the new cutter, different blades are made of varying heights so that they occupy larger or smaller portions of the inverted V and so that the side cutting edges as well as the tip cutting edges of the blades vary in length for different blades disposed at different points around the cutter. In other words, the total cutting contour or profile formed by the tip and opposite side cutting edges or different blades of the cutter varies around the finishing portion of the cutter.

In the cutting of a gear 52, then, according to the present invention, the cutter is preferably of the "single cycle" type, that is, it has blades arranged only part-way around its periphery and there is a gap between the last and first blades to permit indexing the blank when this gap is abreast of the blank without relative withdrawal of the cutter from the work. The blades vary in height as described, and this cutter is rotated on its axis 73 in engagement with the gear blank while a relative rolling movement is produced between the cutter and blank as though the gear to be cut were rolling in mesh with the crown gear represented by the tool.

It is not necessary that the gear be generated conjugate to a true crown gear, but it may also be generated conjugate to a nominal crown gear, as is the case when cutting gears according to the usual practice. As a rule, the latter method of generation is preferable inasmuch as some profile mismatch may be obtained on the gear tooth in this way. In order to generate the gear in this way, the cutter axis may be positioned so that it is parallel to the axis of the cradle of the generating machine, which latter axis represents the axis of the nominal crown gear.

The present invention may be applied also to the generation of one member of a gear pair where the other member is non-generated, that is, form-cut. Formula 1 applies to such gear pairs also and it applies, too, to gear pairs in which the two members have unequal dedenda. In the generation of a gear which is to mesh with a mate, non-generated, form-cut gear, usual practice, so far as the generating roll is concerned, may be followed.

If both members of a gear pair are to be generated with a "single-cycle" cutter of the described character, then, the cutter axis should be so adjusted relative to the gear blank as if to cut a root angle $\gamma r' = \gamma r - (i - d_a)$, where $\gamma r$ denotes the desired root angle.

Broadly the sum of the root angles $\gamma r'$ of both members should be smaller than the sum of the root angles $\gamma r$ by an amount $2(i - d_a)$ and the difference of the root angles $(\gamma r - \gamma r')$ may be split up equally or unequally, as may be desired.

When one gear, usually the larger member of the pair, is produced with the conventional "spread-blade" method, that is, two tooth sides are cut simultaneously, with a standard face-mill gear cutter of known type as is preferred in the manufacture of "Formate," that is, non-generated, gears, then the generated pinion or smaller member of the pair is cut according to the process of the present invention and as if its root angle were $\gamma r' = \gamma r - 2(i - d_a)$.

Since each finishing blade of a cutter constructed according to the present invention is adapted to cut at a definite point along the length of a tooth, the rotation of the cutter must be timed to the generating roll. Figures 3 and 4 illustrate diagrammatically two different methods of timing the rotation of the cutter to the generating roll. For convenience, it is assumed that the axis of each cutter is parallel to the axis of the crown gear to which the gear being cut is to be generated conjugate, as is the case where the gear is generated conjugate to a nominal crown gear.

In Fig. 3, the cutter axis is designated at 90 and the crown gear axis or apex at 91. A portion of the crown gear is shown fragmentarily at 92. During the generating roll, the cutter is rotated on its axis 90, the blank is rotated on its axis which is shown in Fig. 3 projected into the line 93 and simultaneously the axis of the cutter is moved relative to the work about the apex or axis 91 of the crown gear from position at 90' to position 90''. The cutter thus rotates in the direction of the arrow 94 and the work is turned on its axis 93 in direct proportion to the motion of the cutter about crown gear axis 91. Preferably, also, the generating roll is in direct proportion to the rotation 94 of the cutter on its axis as if a circle 95 circumscribed about the axis 90 of the cutter were rolling on a stationary circle 96 concentric with the crown gear apex 91.

In the embodiment illustrated in Fig. 4, the cutter rotates on its axis 100 in the direction indicated by the arrow 104 as it is swung about the axis 101 of the crown gear from the position 100' to the position 100'' and the motion of the cutter is as if a circle 105 circumscribed about the axis 100 of the cutter were rolling internally on a circle 106 concentric to the crown gear apex 101.

Cutters used in accordance with the embodiments illustrated in Figs. 3 and 4 will cut tooth spaces having the desired taper in depth from end to end when the heights of the blades of the cutter vary at a uniform rate. In other words, the top cutting edges of a face-mill gear cutter for practicing the present invention may be arranged to lie in a helix of constant lead whose axis coincides with the axis of the cutter.

Let us now determine the lead of said helix. Referring to Fig. 3, let $m_c$ denote the ratio of circles 96, 95, that is, the ratio of the cutter rotation to the rotation about crown gear apex 91.

$$m_c = \frac{91-97}{97-90}$$

98 and 99 denote the mean circles of the cutter blades when the cutter axis is at the positions 90' and 90'', respectively and 110 denotes the mean circle of the blades when the cutter axis is at its mean position 90. 111 is a point in the pitch-line element 110 at the center of the face of the gear.

Let $ds$ be a very small distance measured along the pitch-line element 110 from the point 111 to a point 113. 114 is a point on the projected gear axis 93, which is at the same distance from the crown gear apex 91 as the point 113.

From Fig. 2 it will be obvious that the further a point in the root surface 82 is away from the apex 57, the shallower the cutter should cut because the further the line 82 is from the line 75. Accordingly, the tool should cut shallower at the point 114 (Fig. 3) than at the point 111 by an amount $$(111-114).\tan(i-\delta a) = ds.\cos\psi.\tan(i-\delta a)$$

We may consider the motion of the cutter as a bodily motion about apex 91 plus a turning motion about the cutter center 90. The bodily motion is through an angle 113—91—114 to bring the point 113 into position 114. This angle is $$\frac{ds.\sin\psi}{A}$$

measured in arc or radians. The turning motion of the cutter on its axis is $$m_c \cdot \frac{ds.\sin\psi}{A}$$

Point 113 in the tip of the cutter is below the level of the cutter tip at point 111, measured axially of the cutter by $$\frac{L_t}{2\pi r} \cdot ds$$

where $L_t$ denotes the sought lead of the tips of the cutter blades. The motion of the cutter about the crown gear axis or apex 91 does not affect the depth of the tooth slots but rotation about the cutter axis 90 does, namely by $$\frac{L_t}{2\pi} \cdot m_c \cdot \frac{ds.\sin\psi}{A}$$

So we have the equation $$ds.\cos\psi.\tan(i-\delta a) = \frac{L_t}{2\pi} \cdot ds \left(1 + m_c \frac{\sin\psi}{A}\right)$$

and $$\frac{L_t}{2\pi r} = \frac{\tan(i-\delta a).\cos\psi}{\left(1 + m_c \frac{r\sin\psi}{A}\right)} \quad (2)$$

where, $$\frac{L_t}{2\pi r}$$

is also the tangent of the lead angle.

Formula 2 also applies to the showing of Fig. 4 if the ratio $m_c$ is introduced as a negative quantity. This will make the resultant lead negative in the latter case and indicates a lead of opposite hand.

Formula 2 also gives the lead angle of the tip surface of the cutter at the mean point 111 even when the cutter rotation and the rate of roll are not in a constant proportion, as when, for instance, the roll is accelerated or slowed down near the end of the roll while the cutter rotation remains constant.

The shape of the surface in which the tips of the cutter should lie may also be determined experimentally by putting a rotating tapered milling cutter embodying the root cone of the gear to be cut in place of the gear blank, and by milling the proper tip surface on a soft cutter blank which is rotated on its axis while being rolled with the said milling cutter as though it were rolling in engagement with the work.

Formula 2 may be a little broadened in scope by putting $(\gamma r' - \gamma r)$ in place of $(i - \delta a)$ so that we have:

$$\frac{L_t}{2\pi r} = \frac{\tan(\gamma r' - \gamma r)\cos\psi}{\left(1 + m_c \frac{r\sin\psi}{A}\right)}$$

Figure 12:
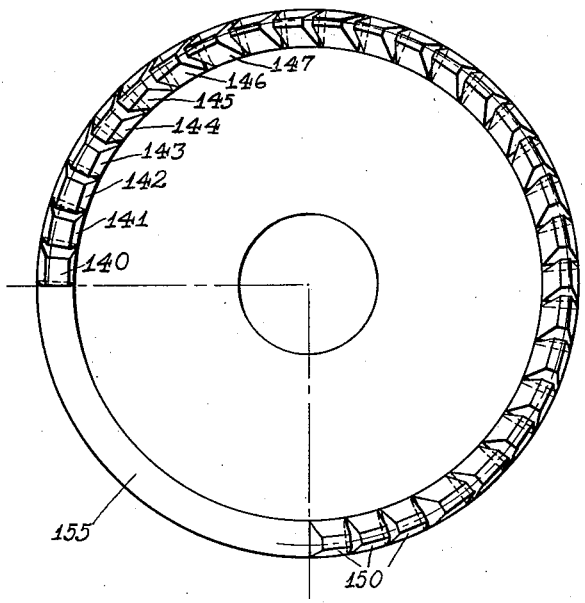
Figs. 12 and 13 are a plan and a developed view, respectively, of one form of face-mill gear cutter made according to the present invention.
Figure 14:
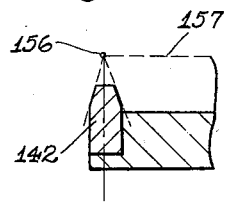
Fig. 14 is a section on the line 14—14 of Fig. 13.

Fig. 5 is a fragmentary axial section of a "single-cycle" cutter constructed according to the principles illustrated in Fig. 3. For the purposes of illustration, the cutting portion of the cutter is here represented as though it were a solid body having opposite side surfaces 115 and 116 and a tip surface 117. Actually, however, the cutting portion of the cutter will be formed by a plurality of cutting blades, as illustrated in Fig. 12, which extend part-way around the periphery of the cutter. These blades are relieved on their top and side surfaces to provide tip and side cutting edges. The surfaces 115, 116 and 117 contain the side and top cutting edges, respectively, of the several blades of the cutter. The blades of the cutter as previously described, are of varying height and the surface 117 which contains the top cutting edges of the blades is a helical surface coaxial with the cutter axis 119.

In the axial section of Fig. 5, the shape of the cutting blade 124 which is adapted to operate at the large end of the tooth spaces of the gear is shown. Fig. 6 shows the shape of the blade 125 which is adapted to operate at the center of the tooth face and Fig. 7 shows the shape of the blade 126 which is adapted to operate at the small end of the tooth space. It will be noted that all of the blades have straight side cutting edges and that these side cutting edges lie in conical surfaces 128 and 129, respectively, which are coaxial with the cutter axis 119. It will be noted, further, that the sides of the blades 124, 125 and 126 converge in points 130, 131 and 132, respectively, all of which lie in a plane 134 which is perpendicular to the axis 119 of the cutter.

The blades 124, 125 and 126 differ from one another in the amount which they occupy of the inverted V formed by their opposite sides. Thus, the blade 125 occupies more of the inverted V than does the blade 124 and likewise the blade 126 occupies more of the inverted V than does the blade 125. Thus, the length of the active side and of the top cutting edges of the various blades differ. Hence the blade 126 will cut a narrower slot than the blade 125 when the cutter is adjusted into engagement with the blank and rotated in engagement therewith. Likewise the blade 125 will cut a narrower slot than the blade 124.

Blades intermediate the blades 124 and 125 and the blades 125 and 126 vary uniformly from one another in height. Thus, the top cutting edges of the blades lie in the helical surface 117, as shown.

The principles upon which cutters of the present invention operate are further illustrated in Figs. 8 to 11 inclusive. In these figures, 170 denotes a bevel gear blank to be cut. 171 is the cone apex of this blank and 172 is its axis. One tooth space is shown in the blank. This tooth space is curved longitudinally and inclined to a cone element of the blank.

As previously described, the cutting operation is effected by rotating a cutter in engagement with a gear blank while producing a relative rolling movement between the cutter and blank. Fig. 8 illustrates the point in the roll at which the cut is taking place at the small end of the tooth space of the blank.

174 is the root circle of the gear at the large end of this tooth space and 175 is the root circle of the gear at the small end of the tooth space. 176 is a point at the middle of the small end of the tooth space. The plane containing the points 171, 177 and 178 is an axial plane of the gear and passes through the point 176 and the axis 172 of the gear when the gear is at that position of the roll where the small end of the tooth space is being cut. 176—179 is a root line element of the gear lying in this axial plane.

180 designates a side cutting edge of that blade of the cutter which is adapted to cut at the small end of the gear tooth. 181 is the point of this cutting edge which cuts in the root surface of the gear at the small end of the tooth space. The point 181 travels in a plane perpendicular to the axis of the cutter as the cutting edge moves across the face of the blank from one end of the tooth to the other in the rotation of the cutter. This plane is denoted at 182 in Fig. 8. The path of the point 181 of the cutting edge 180 as it moves across the face of the gear is denoted by the curved line 183 which lies in the plane 182. The point 184 is the point at the large end of the tooth lying in this plane.

The line 183, which denotes the path of the point 181 across the face of the blank, will appear as a straight line in Fig. 9, which is a section looking at one side of the tooth space. Here the bottom 185 of the tooth space will appear curved because it is wrapped around the cone of the gear.

It will be seen, then, from Figs. 8 and 9 that the cutting edge 180 of the tool which cuts at the small end of the blank will readily clear the large end of the blank and not affect the finishing cut at the large end.

Between the time that the cutting edge 180 takes its cut and the time that the cutting edge, which is intended to operate at the large end of the tooth space of the gear, is ready to take its cut, the gear will have rolled from the position shown in Fig. 8 to that shown in Fig. 10.

186 is the point in the middle of the tooth space at the large end thereof. The plane containing the points 171, 187 and 188 is an axial plane of the blank passing through the point 186 and containing the blank axis 172. The line 186—189 is the root line of the blank in this axial plane. 190 is a side cutting edge of the blade of the cutter which cuts at the large end of the tooth space and 191 is the point in this side cutting edge which operates at the bottom of the tooth space at the large end of the gear. This point moves in a plane perpendicular to the axis of the cutter as it passes across the face of the gear blank. The plane of movement of the point 191 is designated at 192. The point 191 itself travels in the curved path 193 which lies in the plane 192. 194 is a point in this line 193 at the small end of the tooth space. 195 is a point at the bottom of this side of the small end of the tooth space. 196 is a point in the plane 192 and also lying in the axial plane of the work, which plane contains the point 189.

It will be seen that although the point 191 of the cutting edge of the blade which cuts at the large end of the tooth space rotates in a plane 192 which lies below the root surface 175 at the small end of the tooth space by the distance 189—196, interference in depth at the small end of the tooth space by the cutting edge 190 is avoided because of the curvature of the root circle 175 which takes the small end of the tooth space down to the point 195 which lies below the point 194 in the path of the point 191. Thus, the cutting edge 190, which finishes at the large end of the tooth space, does not affect the finished shape at the small end of the tooth space. This is shown clearly also in Fig. 11 where the path 193 of the point 191 appears as a straight line and where the bottom 185 of the tooth space again appears curved because it is wrapped around the cone of the blank.

It is because of the change in position of the blank due to the roll between operation of different blades of the cutter, then, that blades of different height can be used to cut at different points along the length of a tooth space, and each blade may cut at a definite point along the length of the tooth space.

Figure 13:
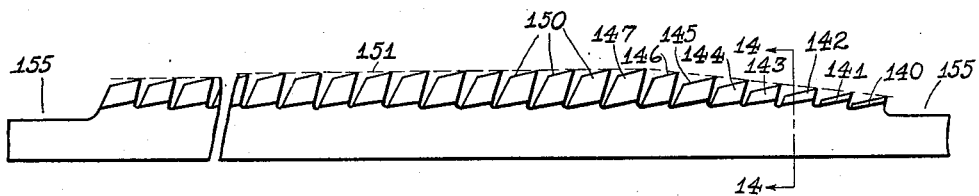

For cutting gears from the solid, a cutter is employed which has both roughing and finishing blades. One form of such tool is illustrated in Figs. 12 and 13. The tools shown are intended to operate according to the arrangement shown in Fig. 3. In this method of operation, with the cutter rotating in the direction of the arrow 94, the cut starts at the small end of the tooth space at the beginning of the roll and ends at the large end of the tooth space at the end of the roll. Accordingly, the cutter will be provided first with a series of roughing teeth 140 to 146 inclusive which are of increasing height to cut successively deeper into the gear blank. These will be followed by a series of finishing teeth, which are designated at 150. The first of these finishing teeth is adapted to finish-cut at the small end of the tooth space, while the last one is adapted to cut at the large end of the tooth space in accordance with the principles of the invention already described. For this purpose, the finishing teeth also vary in height, as indicated by the helix 151 which contains the top cutting edges of these finishing teeth and which appears as a straight line in the development of Fig. 13. The first finishing blade 150 cuts at a point corresponding to the position 90' of the roll (Fig. 3) and the last finishing blade at a point corresponding to the position 90'' of the roll. There is a gap 155 between the last finishing blade 150 and the first roughing blade 140 and when this gap is abreast of the blank in the rotation of the cutter, the blank may be indexed and the cutter returned relative to the blank to its starting position.

The roughing blades 140 to 147 of the cutter preferably will be made with straight side-cutting edges. They may be made of reduced height and have their opposite sides, as in the case of the blade 142, converging at points, such as the point 156, which is situated in the plane 157 which also contains the points of convergence of the sides of the finish-cutting blades. Preferably, however, the roughing blades will be made so that their opposite side cutting edges form an inverted V of slightly less dimension than the inverted V of the finishing blades so that their sides will converge at points which are situated in a plane below the plane 157. Thus, the inside cutting edges of the finishing blades will be closer to the center of the cutter than the inside cutting edges of the roughing blades and the outside cutting edges of the finishing blades will be further away from the center of the cutter than the outside cutting edges of the roughing blades.

Figure 15:
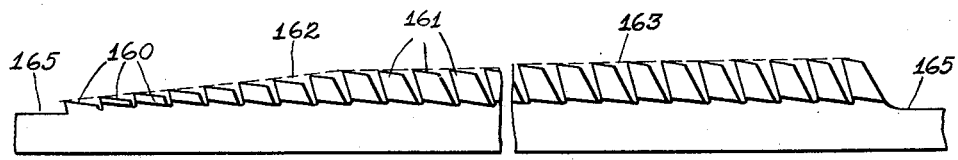
Fig. 15 is a developed view of a cutter which is adapted to rotate in the opposite direction from that of the cutter shown in Figs. 12 and 13.

Fig. 15 illustrates a cutter which is adapted to rotate in the opposite direction from the cutter of Figs. 12 and 13 and which is intended to generate in the down roll, starting at the large end of the tooth space of the gear blank. The roughing blades 160, as before, are of successively increasing height, as indicated by the dotted line 162, so that they cut successively deeper into the blank and the blades 161, which are the finishing blades, are also of successively increasing height. The tops of these finishing blades are arranged in the helix 163, which appears as a straight line in the developed view of Fig. 15. The first finishing blade finish-cuts the large end of a tooth space of the blank and the last finishing blade cuts the small end of the tooth space as the cutter rotates in engagement with the blank and rolls with the blank. There is a gap 165 between the last finishing blade and the first roughing blade and the gear blank is indexed when this gap is abreast of the blank and, at the same time the cutter is returned to starting position relative to the blank by means of the return roll.

In the case of the cutter shown in Fig. 15, the whole cutting operation may be speeded up toward the end of the generating roll because toward the end of the roll, the cutting is at the small end of the tooth space and therefore lightest. Speeding up of the operation includes not only acceleration of the generating roll but acceleration of the cutter rotation.

Cutters for operating according to the arrangement illustrated in Fig. 4 are similar to the cutters illustrated in Figs. 12 to 15 inclusive except for hand and for this reason no further illustration of these cutters need be required.

Figure 16:
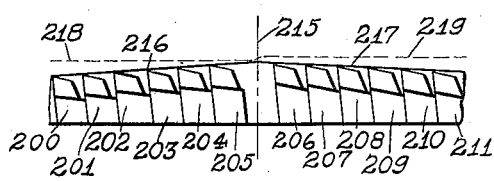
Fig. 16 is a fragmentary diagrammatic view illustrating the construction of a cutter made according to a still further modification of the present invention and adapted to cut during both the forward and return generating rolls.

In the embodiments of the invention already described, the cutter is intended to operate during relative roll of the cutter and blank in one direction. Fig. 16 illustrates diagrammatically a modified form of cutter which is adapted to operate during roll in both directions. Only a few of the blades of the cutter are shown in the fragmentary view given. This cutter is intended to rough-cut during roll in one direction and finish-cut during the return roll. As a result, the blades are arranged so that their tips lie in helices which are inclined in opposite directions with reference to the axis 215 of the cutter. The blades 200 to 205 inclusive are roughing blades and the blades 206 to 211 inclusive are finishing blades. The blades 205 and 206 are adapted to rough-cut and finish-cut, respectively, at the small end of the tooth spaces during roll in opposite directions, while the blades 200 and 211 are adapted to operate further along the tooth space toward the heel or large end of the tooth space. The top cutting edges of the roughing blades lie in a helix 216 and the top cutting edges of the finishing blades lie in a helix 217. The helices appear as straight lines in development.

Preferably, the roughing blades 200 to 205 are made to be of slightly smaller point width than the finishing blades which means that the opposite side cutting edges of the roughing blades will converge in points which lie in a plane 218 that is perpendicular to the axis 215 of the cutter but which is below the plane 219 in which the points of convergence of the sides of the finish-cutting blades 206 to 211 lie.

Figure 17:
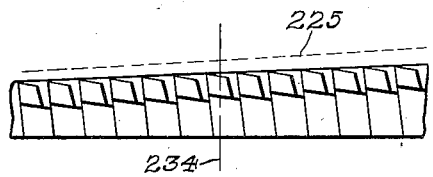
Fig. 17 is a diagrammatic illustration of a cutter made according to a still further embodiment of this invention.

Another embodiment of the invention is illustrated in Fig. 17. Here the points of convergence of the side-cutting edges of the finishing blades do not lie in a plane but in a helical surface 225. Such helical arrangement of the inverted V shape of the side-cutting profiles enables us to control "bias bearing", as will now be described.

In my United States Patent No. 1,980,365, a method has been disclosed for cutting simultaneously two sides of gear teeth without "bias bearing." This method enables us to cut two sides of the teeth of a spiral bevel or hypoid gear simultaneously while nevertheless obtaining a square tooth bearing on both sides. Bias control is also useful to counteract distortion of the teeth of the gear during hardening and it permits of precorrecting the gears for hardening changes.

The method described in my prior patent mentioned consists in adding a straight line motion to the relative rolling motion between the cutter and the work, the straight line motion being preferably in the direction of the axis of the basic gear to which the gear being cut is generated conjugate or in the direction of the cutter axis.

Figure 18:
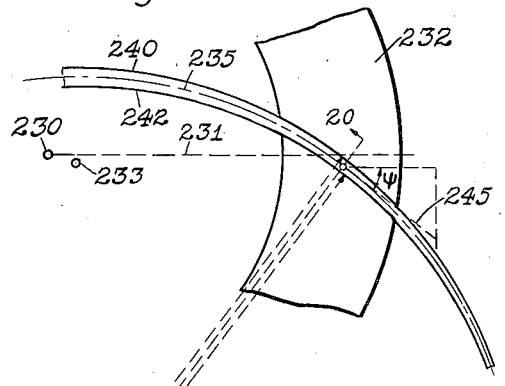
Fig. 18 is a diagrammatic view illustrating the relation between a cutter such as shown in Fig. 17 and the gear being cut and showing how such a cutter may be employed to cut gears without "bias bearing" according to one embodiment of this invention.

To eliminate the requirement for this additional motion and still obtain bias control, a cutter such as illustrated in Fig. 17 may be used for when such a cutter is turned on its axis, it is the equivalent of a face-mill which is turned on its axis and which simultaneously moves along said axis. Certain slight differences in the action will be explained fully hereafter. With the helical type of cutter illustrated in Fig. 17, then, we may obtain simultaneous bias control on both sides of the teeth of the gear without any added motion, the motion along the cutter axis being unnecessary. The operation of a helical cutter in the cutting of a gear blank according to the present invention will now be described. In Fig. 18, 230 denotes the apex of a bevel pinion or gear whose axis is projected into the line 231 and whose developed pitch surface is shown at 232. In the method of my prior patent, the gear or pinion being cut may be generated conjugate either to a basic gear whose axis intersects the axis of the blank or whose axis is offset from the axis of the blank. The same is true in the cutting of gears with a helical cutter according to the present invention. For the purposes of illustration, it is assumed that the gear 232 in Fig. 18 is to be generated conjugate to a basic gear whose axis 233 is offset from the axis of the blank. For convenience, also, it is assumed that the axis 234 of the cutter is parallel to the axis 233 of the basic gear.

235 denotes an exaggerated section through the cutting blades of a cutter of the general type but of the opposite hand of helix from that shown in Fig. 17, the section being taken in a plane perpendicular to the cutter axis. For convenience of illustration, the cutter is shown as though its cutting portion were solid and did not consist of individual cutting blades. 240 denotes the outside cutting surface and 242 the inside cutting surface of the cutter, that is, the lines which contain the outside and inside cutting edges of the cutter in the plane shown.

The cutter is assumed to be rotating in the direction of the arrow 236 during the up-roll and the timing of the cutter to the roll is as though the circle 237 circumscribed about the axis of the cutter were rolling on the circle 238 concentric with the axis 233 of the basic generating gear. With the direction of rotation of the cutter indicated, the high point in the helical surface 225 (Fig. 17) of the cutter will enter the tooth space of the blank first. In the plane of Fig. 18, then, the cutting portion of the cutter will appear as a section 235 which is thinned down from left to right. The cutter has in a sense, then, a circular cutting portion which is moved back along the axis of the cutter during the up-roll. In Fig. 18, the pinion is assumed to be above the drawing plane and consequently to be left-handed.

The outside cutting surface 240 of the helicoidal cutter can be considered as an involute helicoid whose curvature equivalent is known to be a conical surface having an axis 241 parallel to the cutter axis and located on the base circle of the helicoid. Likewise, the inside surface 242 of the cutter can be represented by a conical surface whose axis is at 243. The distance of the axis 241 from the axis 234, or of the axis 243 from the axis 234, is equal to the base radius C of the involute helicoid in question. It is equal to $$\frac{L}{2\pi} \cdot \tan \phi c$$

where $\phi c$ is the pressure angle of the cutter surface in a normal plane tangent to the base cylinder and where L denotes the cutter lead or advance per complete turn.

The analogy with the method of my prior patent is now complete. A helical cutter constructed according to the present invention produces precisely the same results on the tooth sides of a gear blank as two cutters of the face-mill type whose centers 241 and 243 are close together.

If this helical cutter had a constant point width, it would produce a dedendum angle on the blank which is slightly smaller than the dedendum angle produced by a face-mill which is moved along its axis during the roll according to the method of my prior patent. The decrease in dedendum angle is determined by the inclination $j$ of the projected tangent 245 to the helix 235.

$$\tan j = \frac{L}{2\pi r \cdot \cos \psi} \qquad (3)$$

$\psi$ is the spiral angle of the helix, see Fig. 18.

In computing a job, angle $i$ is determined with Formula 1. The imaginary root angles $\Gamma r'$ and $\gamma r'$ should fulfill the equation: $\Gamma r' + \gamma r' = \Sigma - 2i$, where $\Sigma$ denotes the shaft angle between the axes of the two mating gears, which is usually 90°. $\Gamma r'$ and $\gamma r'$ denote the root angles which would be produced were both sides of a tooth space to be cut simultaneously with a face-mill of constant point width.

By making the analysis according to Fig. 18, the settings on the gear cutting machine are determined as if the root angle of the pinion or gear were $(\gamma r' - j)$. To produce the desired root angle, $\gamma r$ the point width of the tool is changed around the cutter circumference as described before and it is believed unnecessary to repeat here the computation for establishing the rate of change of the cutting point width. The cutter point width can also be determined experimentally as pointed out above.

Figure 19:
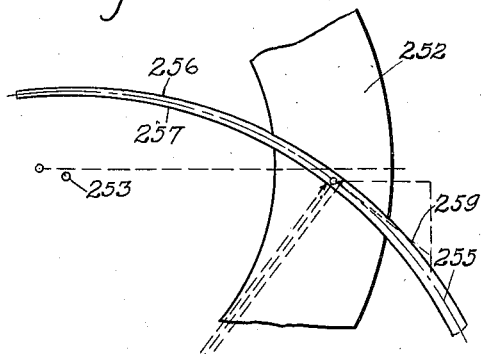
Fig. 19 is a view similar to Fig. 18, but showing the relationships which exist when the cutter is rotated in the opposite direction.

Fig. 19 illustrates the relations which exist between the cutter and the gear blank when the cutter rotation is so timed with the roll as though the circle 247 circumscribed about the axis 244 of the cutter were rolling internally on a stationary circle 248 concentric with the axis 253 of the basic gear to which the gear 252 being cut is to be generated conjugate. The helix in which the points of convergence of the opposite side cutting edges of the cutter lie is denoted at 255. 256 and 257 denote, respectively, the helices in which the outermost points of the outside and inside cutting edges of the different blades of the cutter lie.

In the case illustrated in Fig. 19, the lead of the helical cutter thread should be left hand to remove bias on a spiral bevel pinion or gear which is of left hand, whereas a right hand cutter thread was used in the embodiment illustrated in Fig. 18 to produce a left hand pinion. The width of a section through the cutter thread 255 taken in a plane perpendicular to the axis 244 of the cutter, then, is reduced from right to left at the zone of cutting engagement. A line 259 tangent to the helix 255 is then inclined oppositely to a plane perpendicular to the axis of a cutter as compared with the direction of inclination of the tangent 245 in Fig. 18. The angle $j$ should, therefore, be used as a negative quantity in determining the imaginary root angle $\gamma r' - j$ of the pinion. The negative value of $j$ may also be obtained from the formula for tangent $j$ when the lead L of the cutter thread is introduced as a negative quantity.

Figure 20:
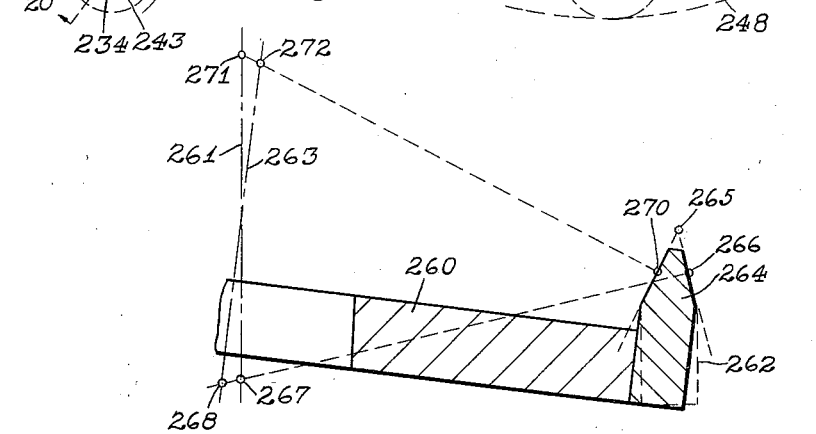
Fig. 20 is a fragmentary axial section of the cutter taken in a plane normal to a side of the gear tooth space being operated upon, and illustrating further principles of the invention.

Fig. 20 is a fragmentary sectional view of a cutter intended to illustrate the fact that various cutters having the same inverted V contour or profile may be substituted for one another in order to control the lengthwise bearing or contact of the teeth of mating gears as is common practice for ordinary face-mill cutters. So, in place of a cutter whose axis is at 261 and one whose blade is denoted in dotted lines at 262 a cutter may be used whose axis is at 263 and one of whose blades is shown in section at 264. The blade 264 has sides which converge in a point 265 which is also the point of convergence of the opposite sides of the blade 262 of the cutter 260. It is readily understood in the art that by substituting one of these cutters for the other, the tooth bearing may be more localized lengthwise of the gear teeth inasmuch as the mean normal cutter radius 266—267 has been increased to 266—268 on the outside cutting surface of the cutter and inasmuch as the mean outside normal cutter radius 270—271 of the inside cutting surface of the cutter has been decreased to 270—272.

Figure 22:
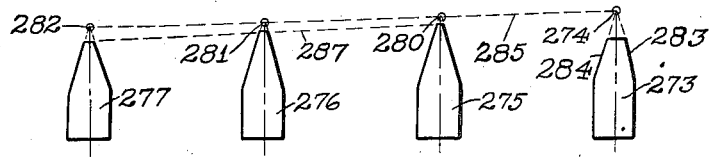
Fig. 22 is a diagrammatic view showing in elevation four spaced blades of the cutter shown in Fig. 21, and illustrating the relation of these blades to one another, the blades shown being located in the cutter at the positions denoted by the lines AA, BB, CC and DD, respectively in Fig. 21.
Figure 21:
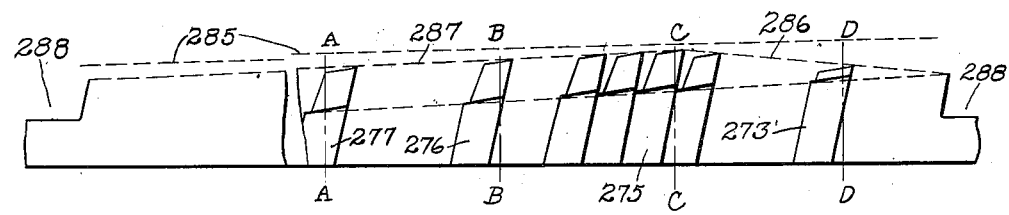
Fig. 21 is a diagrammatic developed view of a cutter such as might be employed in the arrangement illustrated in Fig. 18.

Figs. 21 and 22 show a cutter which is intended, like the cutter illustrated in Fig. 18, to turn in the counter-clockwise direction denoted by the arrow 236 during the up-roll. Only a few of the blades are shown. This cutter has a plurality of roughing blades of gradually increasing height which precede the finishing blades. Both the roughing and finishing blades have opposite side surfaces of the same pressure angle. The opposite side cutting edges of the roughing blades converge in points which lie in the same helix 285 as do the points of convergence of the opposite side-cutting edges of the finishing blades or broadly in a helix of the same lead. Thus, as shown in Fig. 22, the opposite side cutting edges 283 and 284 of the roughing blade 273 converge in a point 274 lying on the helix 285 while the opposite side cutting edges of the finishing blades 275, 276 and 277 converge in points 280, 281 and 282, respectively, which lie on this same helix 285. The roughing blades are of gradually increasing height and successive roughing blades simply occupy varying amounts of the inverted V formed by their opposite sides. Thus, as indicated in Fig. 21, the actual top cutting edges of the roughing blades lie in a helical surface 286. With the arrangement described, the roughing blades are of gradually increasing height leading up to the first finishing blade 275.

The first finishing blade 275 is for finish-cutting the tooth space at the small end thereof. The succeeding finishing blades are each adapted to cut at different points along the length of the tooth space. They have gradually increasing point-width and their tips are at gradually increasing distances from the helix 285. In other words, their tip cutting edges lie in a helix 287 which is inclined to the helix 285. The final finishing blade is adapted to finish-cut at the large end of the tooth space and is followed by a gap 288. When this gap is abreast of the blank, the cutter can be returned relative to the blank to starting position and the blank may be indexed.

Figure 24:
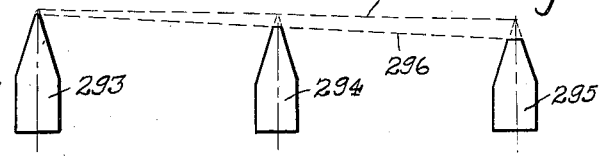
Fig. 24 is a view showing three blades of this cutter in elevation and illustrating the relationship of these blades to one another, the blades shown being those located at the positions denoted by the lines EE, FF and GG, respectively, in Fig. 23.
Figure 23:
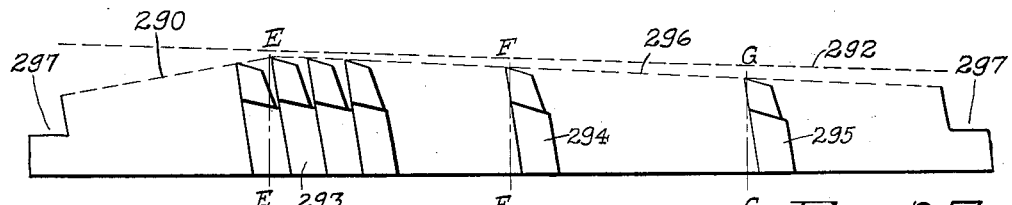
Fig. 23 is a developed view of a cutter such as might be employed for cutting a gear according to the method illustrated in Fig. 19.

Figs. 23 and 24 illustrate a cutter such as may be employed where the cutter rotates in a clockwise direction during the up-roll as indicated by the arrow 246 in Fig. 19. This cutter also has a plurality of roughing blades which are of increasing height and whose tip cutting edges lie in a helix 290. The points of convergence of the opposite side-cutting edges of the rough-cutting blades may lie in the same helix 292 in which the points of convergence of the opposite side cutting edges of the finishing blades lie. The roughing blades precede a finishing blade 293 which is adapted to cut at the small end of the tooth space. The succeeding finishing blades such as the blades 294 and 295 of this cutter are adapted to cut at different points further along the tooth space toward the large end of the tooth. The finishing blades are of gradually decreasing height and point width and their tip-cutting edges lie in a helix 296 which is angularly disposed to the helix 292. There is a gap 297, as before, between the last finishing blade and the first roughing blade to permit of the indexing and return roll.

Figure 26:
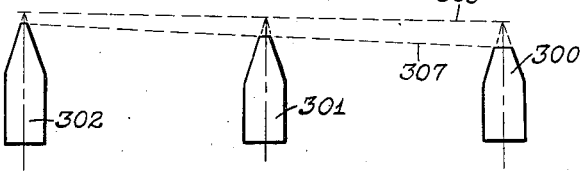
Fig. 26 is a diagrammatic view showing in elevation, three of the blades of this cutter and illustrating the relationship between these blades, the blades shown being located at the positions denoted by the lines HH, II and JJ in Fig. 25.
Figure 25:
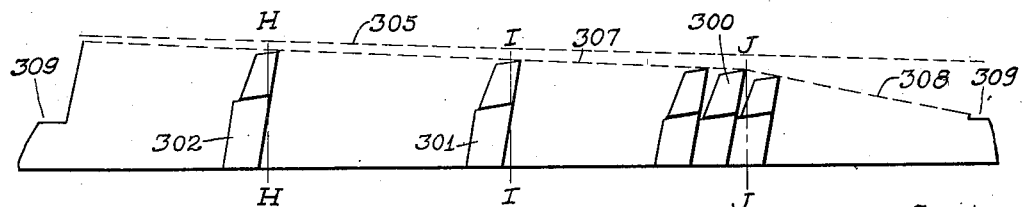
Fig. 25 is a developed view of a cutter for cutting gears according to the method illustrated diagrammatically in Fig. 19 but which will rotate in use in a direction opposite to the direction of rotation indicated in Fig. 19 and which, therefore, will cut in the opposite direction of the generating roll.

Figs. 25 and 26 show a cutter which is adapted to rotate in a counter-clockwise direction and cut during the down roll. In this case, the first finish-cutting blade 300 is for finish-cutting the large end of the tooth spaces of the blank and the last finish-cutting blade is for cutting the small end of the tooth space. Intermediate cutting blades, such as the blades 301 and 302, cut at different points along the tooth space between the large and the small ends thereof. The points of convergence of the opposite side cutting edges of the finishing blades lie in a helix 305 whereas these blades increase in height and decrease in point width and have their tip cutting edges lying in a helix 307 which is inclined to the helix 305.

This cutter is provided with a plurality of roughing blades which are of increasing height and precede the first finishing blade 300. The tip cutting edges of these blades are arranged in a helix 308. There is, as in the case of the other cutters, a gap 309 between the last finish-cutting blade and the first roughing blade to permit of indexing and of the return roll.

In determining the lead of the cutter thread required for complete elimination of "bias bearing", we may first determine the lead $L_m$ of the motion of a conventional face-mill about the axis of the cradle or basic gear represented by the cutter in accordance with the method of my Patent No. 1,980,365. The lead $L$ of the cutter thread is then:

$$L = \frac{Lm}{m_c} \quad (4)$$

where $m_c$ is the number of revolutions of the cutter in a revolution of the cutter center 234 (Fig. 18) about the basic gear axis 233. Of course, in actual practice, the cutter center only moves through a part of a revolution about the basic gear axis 233 in the generation of a tooth space of a gear.

In determining $L_m$, the angle $(2i+jg+jP)$ is used in place of the sum of the dedendum angles. $i$ is given in Formula 1 and $jg$ and $jP$ are the angles $j$ for gear generation and pinion generation, respectively.

A suitable match of the profiles of the mating gears or profile mismatch may be obtained by varying the pitch angle of the basic gear to which the pinion is formed conjugate and which is represented by the tool. A reduced pitch angle of the basic gear gives increased profile mismatch, as will readily be understood.

The lead $L$ as determined above is for the case where a helical cutter is used on the pinion only. If both members of the pair are cut with a helical cutter, the lead $L$ may be split up equally or unequally, as may be desired. When a full profile match is desired, the lead $L_m$ for obtaining a square tooth bearing is:

$$L_m = 2\pi \cdot \frac{A^2}{r} \cdot \cos \psi (2 \tan i + \tan jg + \tan jP)$$

$jP$ is zero when no lead is provided on the inverted V shape of the cutter profile, that is, when the points of convergence of the opposite sides of the finishing blades of the cutter all lie on a circle, that is, in a plane perpendicular to the axis of the cutter. $j$ may be positive, as in the example shown in Fig. 18 or negative as in Fig. 19.

The above described method which uses a helical cutter in the generation of at least one member of the pair is very practical as it permits cutting both sides of a tooth space simultaneously to the desired root angle without additional generating motion, while allowing full control of the tooth bearing, namely, of the length and width of tooth bearing. "Bias bearing" may be eliminated entirely or reduced to any desired extent.

The process employing a helical cutter is also applicable to the generation of hypoid gears conjugate to a basic helicoidal segment such as described in my Patent No. 1,676,371 of July 10, 1928. The helical cutter may represent such a basic helicoidal segment for the helical arrangement of the points of convergence of the opposite sides of the cutting blades permits of eliminating an axial motion and the cutter may be used to represent a helicoidal segment by simply rotating the cutter on its axis while producing a rolling motion between the cutter and blank about an axis representing the axis of this helicoidal segment.

Figs. 27 to 32 inclusive illustrate how the method of the present invention may be applied to the cutting of a spiral bevel or hypoid pinion conjugate to a gear whose tooth surfaces have been cut two sides simultaneously by cutting the pinion with a female tool which is complementary to the male tool employed in the manufacture of the gear.

Figure 27:
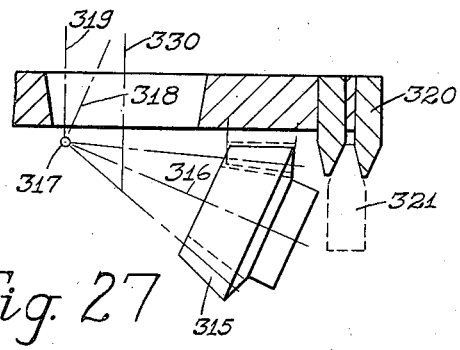
Figs. 27 and 28 are fragmentary sectional and plan views, respectively, illustrating one form of female cutter for cutting spiral bevel and hypoid pinions according to this invention and showing one method of employing the same.

In Fig. 27, 315 denotes the pinion to be cut. Its axis is designated at 316 and its apex at 317. The axis of the mate gear is designated at 318. This mate gear is here assumed generated in the conventional manner conjugate to a nominal crown gear having an axis 319 perpendicular to the root plane of the gear.

It is well known that fully matched tooth surfaces may be obtained on the gear and pinion when the pinion is cut with a female tool which is exactly complementary to the male tool which is employed to cut the gear and whose axis coincides with the axis of the gear cutter. In other words, the pinion 315 might be cut to fully match the tooth surfaces of its mate gear by using a female cutter 320 which straddles and is exactly complementary to the male cutter 321 employed in the cutting of the gear. The pinion cutter 320 will then represent a tooth space of the nominal crown gear to which the gear was generated conjugate. It has two concentric rows of cutting blades and these are adapted to cut opposite sides of a tooth of the pinion simultaneously. Generation of the pinion is effected by producing a relative rolling movement between the cutter and the pinion blank as if the crown gear and pinion were meshing together.

The obvious draw-back of such generation hitherto has been the fact that it has been necessary to cut the tooth spaces of uniform depth from end to end and consequently the teeth have been weak at their small ends and undercut on the pinion. If the female cutter is made, however, in accordance with the present invention so that each finish-cutting edge of the cutter is adapted to cut at some definite point along the length of the teeth and the rotation of the cutter is timed with the generating roll, a pinion can be generated whose teeth taper in depth from end to end. The desired taper in depth can be obtained by simply adapting the height of the cutting edges of the female tool to the tooth depth desired at the point where each cutting edge cuts.

Figure 31:
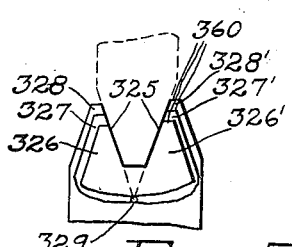
Fig. 31 is a diagrammatic view showing the shape of different blades of a female cutter made according to one embodiment of this invention.
Figure 32:
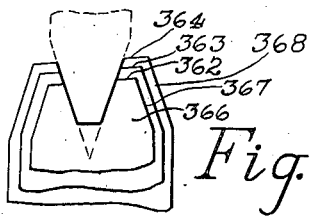
Fig. 32 is a corresponding view showing several blades of a cutter made according to a different embodiment of the invention.

The required construction of the female tool is indicated diagrammatically in Fig. 31. 325 denotes the sides of a tooth space of the crown gear or the opposite side cutting edges of the cutter which cuts the gear. 326, 326'; 327, 327'; and 328, 328' denote different cutting blades of the female cutter which is complementary to the gear cutter and which is adapted to represent the sides 325 of a tooth space of the crown gear teeth and cut opposite sides of the teeth of the pinion. The blades 326, 326'; 327, 327' and 328, 328' are arranged in pairs which are adapted to cut opposite sides of a tooth of the pinion in a revolution of the cutter. The different pairs of blades are of varying height around the cutter. In the embodiment shown, the adjacent side cutting edges of the different pairs of blades converge in points 329 which lie all in the same plane perpendicular to the axis of the cutter. The cutter might be made, however, so that the points of convergence would lie in a helix for the purpose above described.

The cutting blades 326, 326' are adapted to cut at the small end of a tooth of the pinion. The cutting blades 327, 327' have a height to cut at the center of a tooth of the pinion and the cutting blades 328, 328' have a height adapted to properly form the large end of the tooth. In a "single cycle" female cutter, there will be provided, of course, several cutting blades intermediate the blades which cut at the small end and those which cut at the center and intermediate those which cut at the center and those which cut at the large end, the number depending, of course, upon the smoothness of finish desired upon the pinion tooth cut.

Figure 28:
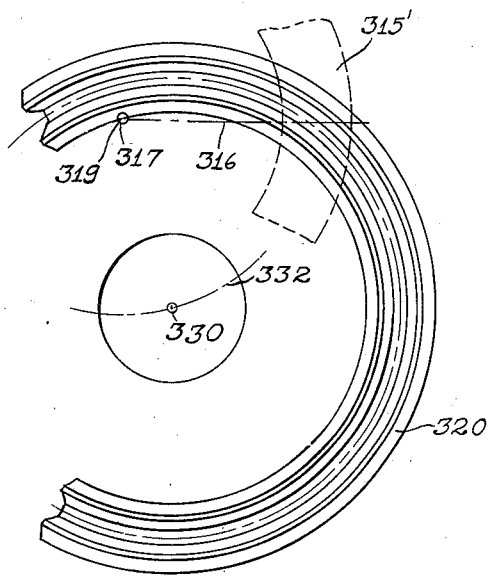

In Fig. 28, the female cutter is shown diagrammatically and at a mean position of the roll. The developed pitch surface of the pinion is indicated in dotted lines 315'. The generation of the pinion is effected as in other embodiments of the invention. The cutter is rotated on its axis 330 and simultaneously a relative rolling movement is produced between the cutter and blank during which the cutter is swung relative to the blank about the axis 319 of the crown gear so that the axis of the cutter describes the arc 332. When the gap in the cutter is abreast of the blank, the blank is indexed and the cutter is returned relative to the blank to starting position.

Figure 29:
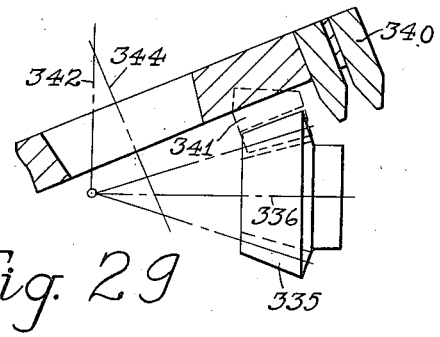
Figs. 29 and 30 are corresponding views illustrating another method of cutting pinions with a female tool according to the present invention.
Figure 30:
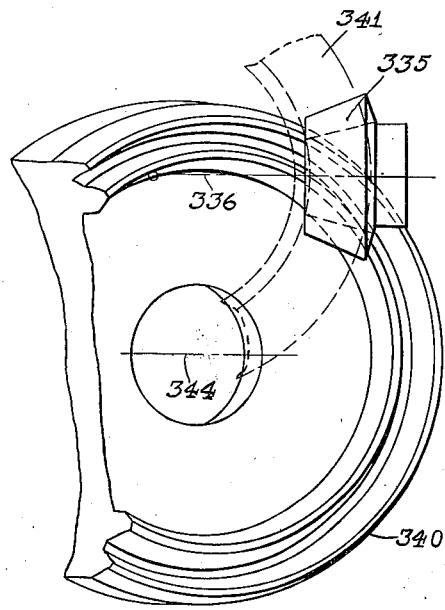

Figs. 29 and 30 illustrate how the method of cutting with a female "single cycle" cutter constructed according to the present invention may be applied to the generation of a pinion conjugate to a non-generated or "Formate" gear. 335 is the pinion to be cut and 341 denotes its mate, non-generated gear. 336 designates the axis of the pinion and 342 the axis of the gear. These axes are shown at right angles to one another. The female "single-cycle" cutter 340 used for cutting the pinion has an axis 344 which coincides with the axis of the gear cutter and occupies the same position with respect to the axis of the cradle of the pinion cutting machine as the gear cutter does with respect to the gear axis. The female cutter represents a tooth space of the mate gear 341. The female cutter, as in the previously described embodiment of the invention, has cutting blades of varying height around its periphery which are adapted, respectively, to cut at definite points along the length of a tooth and thereby cut the teeth on the pinion of proper taper in height from end to end. The teeth of the pinion are generated by rotating the cutter 340 on its axis 344 and simultaneously effecting a relative rolling movement between the cutter and the pinion blank as though the pinion blank were rolling with its mate gear 341. When the gap in the cutter is abreast of the blank, the blank is indexed and the cutter is returned relative to the blank to starting position. Fig. 30 shows a mean position in the generating roll.

Figure 33:
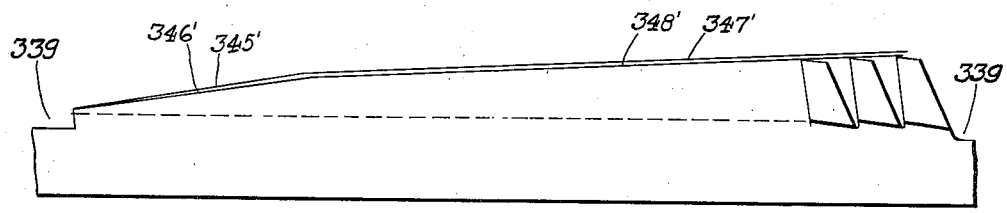
Figs. 33 and 34 are a developed side elevation and a plan view, respectively, of a female cutting tool made according to this invention.
Figure 34:
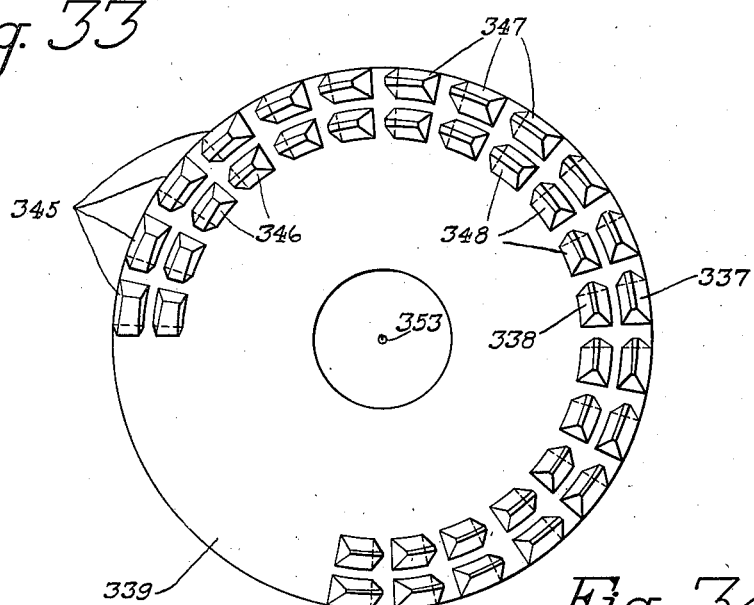

For cutting pinions from the solid, a female cutter may be used such as shown in Figs. 33 and 34. This cutter has its blades arranged, as before, in two concentric rows 337 and 338 partway around its periphery and there is an indexing gap 339 between the last blades of the two rows and the first blades thereof. The first blades of each row are roughing blades and are designated at 345 and 346, respectively. These blades increase in height up to the height of the first finishing blade. The finishing blades, denoted at 347 and 348, respectively, also vary in height being made according to the principles of this invention so that different finishing blades will finish-cut at different definite points along the length of a tooth during the generating roll and in a revolution of the cutter.

The variation in height of the roughing blades is indicated diagrammatically in Fig. 33 by the lines 345' and 346' and the variation in height of the finishing blades by the lines 347' and 348'. These lines represent the helices in which the top cutting edges of the respective blades lie. The opposite side cutting edges of the finishing blades converge preferably in points lying on a circle in a plane perpendicular to the axis 353 of the cutter or they may converge in points lying on a helix coaxial with the cutter according to the previously described principles of the invention. The opposite side cutting edges of the roughing blades may converge in the same circle or in the same helix on which the points of convergence of the finishing blades lie or may converge on different circles or a different helix, also according to previously described principles of the invention.

It will be noted that, as indicated in Fig. 33, the blades in the outer row 337 are slightly higher than the corresponding blades in the row 338. This is because the cutting edges of the outer row cut the root surface at a point further towards the heel or large end of the tooth than the cutting edges of the inner row.

The present invention may be applied, of course, in the generation of hypoid as well as spiral bevel pinions. For generating a hypoid pinion conjugate to a crown gear, of course, the axis of the hypoid pinion blank will be offset from the axis of the crown gear and for generation of a hypoid pinion conjugate to a non-generated gear, the axis of the hypoid pinion blank will be offset from the axis of the non-generated gear during generation.

In all of the described embodiments of the invention, the cutter performs a complete revolution for each complete generating roll. The tool may be rotated continuously in one direction or it may be oscillated back and forth, one complete oscillation being effected for each generating roll. In the latter case, the cutter may be geared directly to the cradle of the generating machine and a larger portion of the complete circumference of the cutter may be used for cutting edges. When cutting from the solid, it is desirable, but not necessary to separate the tool from the work during the return stroke of the tool if an oscillatory cutter is employed. This may be effected by a very slight axial displacement of the cutter through a fractional part of the tooth depth, or, in the case of helical cutters, such as shown in Figs. 21 to 26 inclusive, it may be effected through a slight rotation of the cutter about its axis. Thus, the cutter shown in Fig. 21 may be rotated about its axis so as to displace it slightly to the right in Fig. 21, and cause the cutting blades to clear the bottom and the sides of the tooth space which has been cut.

A tool which is adapted to oscillate back and forth during a complete generating roll will be of the same general construction as a tool of the "single-cycle" type already described, but a smaller gap between the last and first cutting blades is required for indexing inasmuch as indexing is effected at one end of the roll when, due to the reversal of the oscillation of the tool, the tool practically stands still.

It is also within the contemplation of this invention to index the work after a plurality of revolutions or oscillations of the cutting tool and not after each revolution or oscillation. This procedure may be desirable for finish-cutting large gears and for shaving or lapping gears. When several passes of the cutter are used for finishing, the cutter position is preferably varied slightly on the different passes, so that the cut of a given cutting edge does not take place at exactly the same spot on the work but a cutting edge cuts in slightly different positions on each revolution or oscillation of the cutter so that the several cuts taken by the cutting edge will overlap. If, for instance, three finishing passes are to be taken, the cutter may be slightly rotated about its axis through one third of the pitch of its cutting edges between each pass.

As indicated above, the present invention is not restricted to the cutting of gears but may also be employed in the shaving, lapping or burnishing of gears. The lapping, burnishing or shaving tools may be either of the male or female type. A female shaving tool is shown in Figs. 35 to 39 inclusive. This tool is adapted to straddle a tooth of the gear to be shaved. It has adjacent operating surfaces 350 and 351 which are provided with spaced grooves 352 which extend in the direction of the profile of the operating surfaces and provide a plurality of spaced cutting edges 354 which are unrelieved and which effect the shaving action in the manner of conventional shaving tools. The shaving edges may also be arranged diagonally of the operating surfaces of the tools in a manner similar to the shaving edges of known spiral bevel shaving tools.

Figure 35:
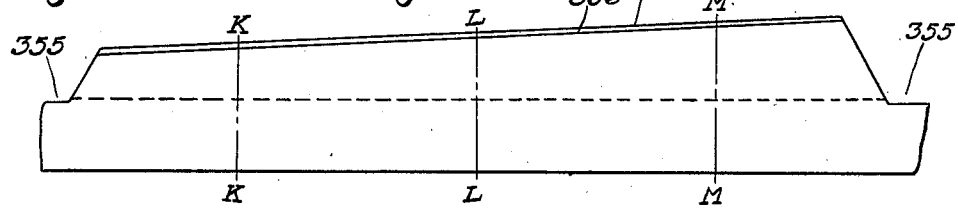
Fig. 35 is a developed side elevation and Fig. 36 a developed sectional view of a shaving tool corresponding to the cutting tool shown in Figs. 33 and 34 and constructed according to one embodiment of this invention.
Figure 36:
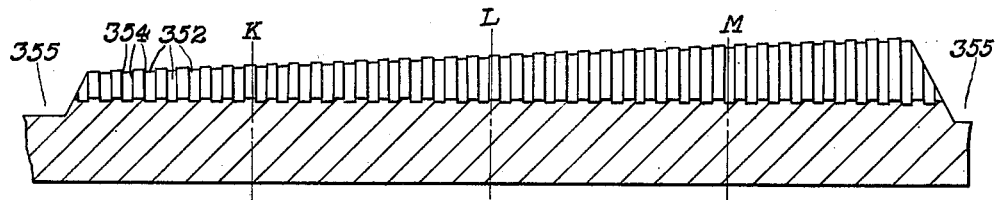

The views of Figs. 35 and 36 are developed views. The shaving surfaces extend part-way around the periphery of the tool which is of the face-mill type and there is a gap 355 provided which is of sufficient angular extent to permit of indexing the gear without withdrawal of the shaving tool.

Figure 37:
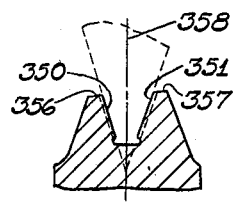
Figs. 37, 38 and 39 are sections through this tool taken on the lines KK, LL, MM, respectively, of Figs. 35 and 36.
Figure 38:
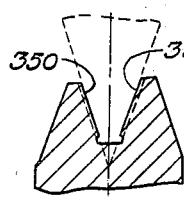
Figure 39:
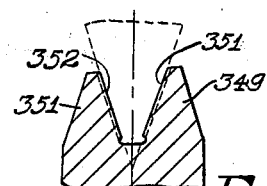

The height of the shaving surface varies around the periphery of the tool since one part of the tool is adapted to shave at the small end of the tooth of the gear and another part at the middle of the length of the tooth and still another part at the large end of the tooth. The two arcuate operating portions 349 and 351 have, accordingly, tip surfaces which are helical but which appear as straight lines in Fig. 35. 356 denotes the helical top surface of the part 351 and 357 the helical top surface of the part 349. It will be noted, further, that the tip surfaces of the tool in any section through the tool, such as the sections in Figs. 37, 38 and 39, are in a line inclined to a line 358 parallel to the cutter axis. This is because the cutting edges of the shaving tool, which are disposed at opposite sides of the groove opposite one another, cut at different radial distances from the center of the gear due to the curvature of the gear teeth and their spiral angle and therefore, their tip must conform to different parts of the root cone of the gear being shaved.

For lapping or burnishing, tools are made according to the previously described principles of the invention but without cutting edges.

In the embodiment of the invention illustrated in Fig. 31, the two parts of the female cutter have a constant point width 360 all along the thread. The point width of the cutting teeth may be varied, however, along the thread of the tool, as indicated at 362, 363 and 364 in Fig. 32. Here three different blades of the female cutter are shown which are designated at 366, 367 and 368, respectively. These blades vary in height in accordance with the difference in height of the teeth to be cut at different points along their length and the point widths 362, 363 and 364 of these cutting blades or teeth vary in width in accordance with the variation in width of the tooth slots of the gear along their length.

While the invention has been described in connection with embodiments in which the tools have straight side cutting edges, it will be understood that the invention is applicable also to tools with curved side cutting edges. Several such possible embodiments are illustrated in Figs. 40 to 42 inclusive. Thus in Fig. 40, a blade of a cutter is shown at 420 which has outside and inside cutting edges 421 and 422 which are of concave profile. In Fig. 41 a blade 425 of a cutter is shown which has outside cutting edges 426 of straight profile and inside cutting edges 427 of concave shape. In Fig. 42 a blade 430 of the cutter is shown which has a convex outside cutting edge 431 and a concave inside cutting edge 432. The edges 431 and 432 may have their centers on the axis of the cutter so that the cutter in operation will trace spherical surfaces of revolution.

The blades of cutters made according to this invention may be sharpened so that each blade has opposite side-cutting edges or alternate blades may be sharpened to have oppositely disposed side cutting edges or any other suitable method of sharpening may be employed. Where different blades have oppositely disposed cutting edges, the inverted V, in which opposite side cutting edges of blades lie, is understood to be the V formed by the axial profile of the surfaces in which the outside and inside cutting edges lie, that is to say, the axial profile of the cutting surfaces.

While the invention has been described in connection with a number of different embodiments thereof, it will be understood that it is capable of still further modifications. This application is intended to cover any variations, uses, or adaptations of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. The method of cutting tapered gears which comprises employing a tool that has a plurality of cutting blades of progressively varying height which are adapted to operate, respectively, at definite, different points along the length of a tooth surface of a gear, and imparting a cutting motion to the tool while producing a relative rolling movement between the tool and blank which is so coordinated to the tool motion that a tooth surface of tapering depth from end to end is cut in the blank during a single pass of said tool through a tooth space of the blank, and indexing the blank after each pass of the tool.

2. The method of cutting tapered gears which comprises employing a tool that has an effective operating portion of varying height projecting beyond one side face and arranged part-way only around its periphery with a gap between the last and the first parts of said operating portion, and rotating said tool in engagement with the work while producing a relative rolling movement between the tool and work which is timed to the rotation of the tool, and indexing the work when the gap in the tool is abreast of the work.

3. The method of cutting tapered gears which comprises employing a face-mill cutter that has a plurality of cutting blades of progressively varying shape projecting beyond one of its side faces and arranged only part-way around its periphery, rotating the cutter in engagement with a gear blank while producing a relative rolling movement between the cutter and the blank so timed to the cutter rotation that different blades of the cutter cut at different points of the roll, and indexing the blank when the gap in the cutter is abreast of the blank.

4. The method of forming gears which comprises employing a tool which has a forming portion whose contour varies along the forming portion, mounting said tool in engagement with a gear blank and actuating the tool to move the forming portion through a tooth space of the gear blank while effecting a rolling generating motion between the tool and blank so timed to the tool movement that different parts of the forming portion of the tool engage the blank at different points in the generating roll and one generating cycle takes place for each pass of the tool through a tooth space of the blank, and indexing the blank periodically.

5. A face-mill gear cutter comprising a rotary head and a plurality of cutting blades which project beyond one side face of the head and are arranged in two concentric rows that are adapted to operate simultaneously in adjacent tooth spaces of the gear to be cut, the blades of each row being of progressively varying height and being arranged part-way only around the periphery of the head with a gap between the last and first blades, said gap being of sufficient angular extent to permit indexing the gear blank being cut when the gap is abreast of the blank.

6. The method of cutting a tapered gear which comprises employing a tool having a plurality of cutting edges of progressively varying shape and imparting a cutting motion to the tool while producing a relative rolling movement between the tool and blank which is timed to the cutting motion of the tool so that different cutting edges of the tool engage the blank at different points in the generating roll, and periodically indexing the blank.

7. The method of cutting a gear which comprises employing a cutter that has a plurality of rough-cutting blades followed by a plurality of finish-cutting blades arranged partway around its periphery with a gap between the last and first blades, rotating the cutter in engagement with a gear blank and effecting a relative translatory movement between the cutter and the blank in one direction while the roughing blades are cutting and in the opposite direction while the finishing blades are cutting, and indexing the blank when the gap in the cutter is abreast of the blank.

8. The method of cutting a gear which comprises employing a face-mill gear cutter which has a plurality of rough-cutting blades followed by a plurality of finish-cutting blades arranged part-way only around its periphery with a gap between the last and first blades, adjusting said cutter into engagement with a gear blank so that the cutter will cut to the full depth of the tooth spaces of the blank without relative feed movement between the cutter and blank, and rotating the cutter in engagement with the blank and producing a relative rolling movement between the cutter and blank in one direction while the roughing blades are taking their cut and in the opposite direction while the finishing blades are taking their cut, and indexing the blank when the gap in the cutter is abreast of the blank.

9. The method of producing a gear which comprises employing a rotary tool which has an operating surface arranged part-way only around its periphery whose effective contour varies from one end to the other and which has a peripheral gap between its ends, rotating said tool in engagement with a gear blank while effecting a relative translatory movement between the tool and blank which is so timed to the tool rotation that different parts of the operating surface of the tool operate at different points along the tooth surface of the blank, and indexing the blank when the gap in the tool is abreast of the blank.

10. The method of producing a tapered gear which comprises employing a rotary tool which has an operating surface arranged part-way only around its periphery which is of progressively vary height and has a gap between its ends and rotating the tool in engagement with a tapered gear blank while producing a relative rolling movement between the tool and blank so that the portion of the operating surface of the tool which is of smallest height operates at the large end of a tooth space of the blank and the portion of the operating surface of the tool which is of the greatest height operates at the small end of a tooth space of the blank, and indexing the blank when the gap in the tool is abreast of the blank.

11. The method of producing a tapered gear which comprises employing a rotary tool which has an operating surface, whose opposite sides are inclined to the axis of the tool and which projects beyond one side face of the tool in the general direction of the axis of the tool and which is of progressively varying height and of progressively varying point-width and which extends part way only around the periphery of the tool with a gap between its ends, rotating said tool in engagement with the work and producing a relative rolling movement between the tool and work in time with the tool rotation so that different parts of the operating surface of the tool are in operation at different points of the generating roll, and indexing the work when the gap in the tool is abreast of the work.

12. The method of producing a tapered gear which comprises employing a rotary tool which has an operative portion that projects beyond one side face of the tool in the general direction of the axis of the tool and which is of progressively varying height and whose opposite side portions are inclined to the axis of the tool and converge in points that lie on a helix coaxial with the tool, and rotating said tool in engagement with a tapered gear blank while producing a relative rolling movement between the tool and work in time with the tool rotation so that different parts of the operating portion of the tool are in operation at different points of the generating roll, and indexing the blank periodically.

13. The method of producing a tapered gear which comprises employing a rotary cutter having a plurality of cutting blades which project beyond one side face of the tool in the general direction of the axis of the tool and are of progressively varying height and which are arranged part-way only around its periphery with a gap between the last and first blades and whose opposite side cutting edges are inclined to the axis of the cutter and converge in points that lie on a helix coaxial with the cutter, rotating the cutter in engagement with a tapered gear blank and producing a relative rolling movement between the cutter and blank in time with the cutter rotation so that different blades of the cutter cut at different points in the roll, and indexing the blank when the gap in the cutter is abreast of the blank.

14. The method of producing a tapered gear which comprises employing a rotary tool which has a plurality of cutting plades that are of progressively increasing height and that project beyond one side face of the tool in the general direction of the axis of the tool and that are arranged part-way only around its periphery with a gap between the last and first blades, the opposite side-cutting edges of which converge in points that lie on a circle in a plane perpendicular to the axis of the tool, positioning said tool so that its axis is perpendicular to the root surface of the blank, and rotating the tool in engagement with the blank while producing a relative rolling movement between the tool and blank, the direction of roll being so chosen relative to the tool rotation that the cutting blades of the tool which are of greatest height cut at the small end of a tooth space of the blank, and indexing the blank when the gap in the tool is abreast of the blank.

15. The method of producing a gear which comprises employing a rotary tool which has a plurality of roughing blades of progressively varying height followed by a plurality of finishing blades of progressively varying height arranged part-way around its periphery with a gap between the last and first blades, and rotating said tool in engagement with a gear blank while producing a relative translatory movement between the tool and blank in time with the tool rotation and which is in one direction while the roughing blades are cutting and in the opposite direction while the finishing blades are cutting, and indexing the blank when the gap in the tool is abreast of the blank.

16. The method of producing a tapered gear which comprises employing a rotary tool that has a plurality of roughing blades of progressively increasing height followed by a plurality of finishing blades of progressively increasing height projecting from one of its side faces in the general direction of its axis and arranged part-way only around its periphery with a gap between the last and first blades, and rotating said tool in engagement with the blank while producing a relative rolling movement between the tool and blank in time with the tool rotation and which is in one direction while the roughing blades are cutting and in the opposite direction while the finishing blades are cutting, and indexing the blank when the gap in the tool is abreast of the blank.

17. A rotary gear cutter having a plurality of finish-cutting blades projecting beyond one side face in the general direction of the axis of the cutter and arranged part-way only around the periphery of the cutter with a gap between the last and first blades, said finishing blades being of progressively varying point width and having side cutting edges which are inclined to the axis of the cutter and are of progressively varying height so that corresponding side-cutting edges of successive finishing blades occupy progressively varying parts of the effective cutting surfaces formed by said cutting edges, and said gap being of sufficient angular extent to permit of indexing a gear blank without relative withdrawal of the cutter from the blank when the gap in the cutter is abreast of the blank.

18. A rotary gear cutter having a plurality of roughing blades and a plurality of finishing blades projecting beyond one side face in the general direction of its axis and arranged part-way only around its periphery with a gap between the last and first blades, both said finishing and said roughing blades having side cutting edges which are inclined to the axis of the cutter and which are of progressively varying height, corresponding side cutting edges of the finishing blades being of the same profile shape and having uniform positive inclination to the axis of the cutter, and said gap being of sufficient angular extent to permit of indexing a gear blank, without relative withdrawal of the cutter from the blank, when the gap in the cutter is abreast of the blank.

19. A rotary gear cutter having a plurality of roughing blades followed by a plurality of finishing blades projecting beyond one side face of the cutter in the general direction of the axis of the cutter and arranged part-way only around the periphery of the cutter, said roughing blades being of progressively increasing height and said finishing blades being of progressively decreasing height, and said gap being of sufficient angular extent to permit of indexing a gear blank when the gap is abreast of the blank, without relative separation of the cutter and blank.

20. A rotary gear cutter for cutting tapered gears by continuous rotation of the cutter and intermittent indexing of the gear blank, said cutter having a plurality of cutting blades projecting beyond one side face in the general direction of its axis and arranged part-way only around its periphery with a gap between the last and first blades, said blades being of progressively varying height and having their top cutting edges arranged in a helix and having their opposite side cutting edges converging in points which lie in a helix that is inclined to the first named helix.

21. A rotary gear cutter comprising a rotary head and a plurality of side-cutting blades which project beyond one side face of the head in the general direction of the axis of the head and are arranged in two circularly concentric rows part-way around the periphery of the head with a gap between the last and first blades of sufficient angular extent to permit of indexing a gear blank, when the gap is abreast of the blank, without relative separation of the cutter from the blank, said two rows of blades being adapted to operate simultaneously in adjacent tooth spaces of the blank, and each row of blades comprising a plurality of roughing blades that are followed by a plurality of finishing blades, opposite side cutting edges of the finishing blades being offset radially inwardly and outwardly, respectively, relative to the corresponding side cutting edges of the roughing blades.

22. A face-mill gear cutter comprising a rotary head and a plurality of side-cutting blades which project beyond one side face of the head in the general direction of the axis of the head and are arranged in two circularly concentric rows, each extending part-way only around the periphery of the head and the two rows having radially aligned gaps between their last and first blades of sufficient angular extent to permit of indexing the blank, when the gaps are abreast of the blank, without relative separation of the cutter and blank, the blades of the two rows being adapted to cut simultaneously opposite sides of a tooth of the blank.

23. The method of producing a gear which comprises employing a rotary cutter that has a plurality of side-cutting blades which project beyond one side face of the cutter in the general direction of its axis and are arranged circularly about said axis, corresponding side cutting edges of said blades being inclined to the axis of the head and being of constant profile shape but varying progressively in height, and rotating said cutter in engagement with a gear blank while producing a relative rolling movement between the cutter and blank in time with the cutter rotation so that different blades cut at different points in the roll, and indexing the blank periodically.

24. The method of producing a gear which comprises employing a rotary cutter that has a plurality of side-cutting blades projecting beyond one side face of the cutter in the general direction of the axis of the cutter and arranged in two circularly concentric rows part-way around its periphery so that there are two aligned gaps between the last and first blades of the two rows, the blades of each row having opposite side cutting edges which are of progressively varying height, engaging said cutter with a gear blank so that the two rows of blades cut in adjacent tooth spaces of the blank, and rotating said cutter in engagement with the blank while producing a relative rolling movement between the cutter and the blank in time with the cutter rotation so that different blades of the cutter cut at different points in the roll and the cutter makes one revolution during a generating cycle, and indexing the blank when the gap in the cutter is abreast of the blank.

25. The method of producing a gear which comprises employing a rotary cutter that has a plurality of side-cutting blades projecting beyond one side face of the cutter in the general direction of the axis of the cutter and arranged in two circularly concentric rows, the blades of each row having opposite side-cutting edges which are inclined to the axis of the cutter and which are of progressively varying height, engaging said cutter with a gear blank so that the two rows of blades cut in adjacent tooth spaces of the blank simultaneously, and rotating said cutter in engagement with the blank while producing a relative rolling movement between the cutter and blank in time with the cutter rotation so that different blades of the cutter cut at different points in the generating roll and indexing the blank periodically.

26. The method of producing a gear which comprises employing a tool that has an operating portion projecting beyond one side face in the general direction of its axis and arranged circularly about said axis and that is of progressively varying height and of progressively varying point-width, oscillating said tool about its axis in engagement with a gear blank while producing a relative rolling movement between the tool and blank in such timed relation that one complete oscillation of the tool takes place for each complete rolling movement and different parts of the operating portion of the tool operate at different points along the length of a tooth of the gear at different points in the generating roll, and indexing the blank periodically.

27. A face-mill gear cutter comprising a rotary head and a plurality of cutting blades which project beyond one side face of the head in the general direction of the axis of the head and are circularly arranged part-way only around the periphery of the head with a gap between the last and first blades which is of sufficient angular extent to permit of indexing a gear blank, when the gap is abreast of the blank, without relative withdrawal of the cutter from the blank, said blades having opposite side cutting edges which are positively inclined to the axis of the cutter and are of progressively varying height, said blades projecting at progressively varying distances from the face of the cutter head and being of progressively varying point-widths.

28. A face-mill gear cutter comprising a rotary head and a plurality of cutting blades which project beyond one side face of the head and are circularly arranged part-way only around the periphery of the head with a gap between the last and first blades that is of sufficient angular extent to permit of indexing the gear blank, when the gap is abreast of the blank, without relative withdrawal of the cutter from the blank, said blades having opposite side-cutting edges which are positively inclined to the axis of the cutter and which lie in coaxial conical surfaces, corresponding side cutting edges being of progressively varying height, and said blades projecting at progressively varying distances from the face of the cutter head and being of progressively varying point-width.

29. A face-mill gear cutter comprising a rotary head and a plurality of cutting blades which project beyond one side face of the head and are circularly arranged part-way only around the periphery of the head with a gap between the first and last blades that is of sufficient angular extent to permit of indexing a gear blank, when the gap in the cutter is abreast of the blank, without relative withdrawal of the cutter from the blank, said blades having opposite side-cutting edges which are positively inclined to the axis of the cutter and which converge in points that lie in a helix coaxial with the cutter, corresponding side-cutting edges being uniformly inclined to the axis of the cutter and being of progressively varying height, the top cutting edges of the blades being arranged in a helix which is inclined to the first named helix.

30. The method of producing a tapered gear which comprises employing a rotary tool that has an operating portion which projects beyond one side face of the tool in the general direction of the axis of the tool whose opposite sides are inclined to the axis of the tool and that is of progressively varying height and of progressively varying point-width, and rotating said tool in engagement with a gear blank while producing a relative rolling movement between the tool and blank so timed to the tool rotation that different parts of the operating portion of the tool are in operation at different points of the roll, and indexing the blank periodically.

31. The method of producing a tapered gear which comprises employing a rotary tool that has an operating portion that projects beyond one side face of the tool in the general direction of the axis of the tool whose opposite sides are inclined to the axis of the tool and lie in coaxial conical surfaces and that is of progressively varying height and of progressively varying point-width, and rotating said tool in engagement with a gear blank while producing a relative rolling movement between the tool and blank so timed to the tool rotation that different parts of the operating portion of the tool are in operation at different points of the roll.

32. The method of producing a tapered gear which comprises employing a rotary tool that has an operating surface that projects beyond one side face of the tool in the general direction of the axis of the tool whose opposite sides are inclined to the axis of the tool and converge in points lying in a helix coaxial with the tool and that is of progressively varying height and of progressively varying point width, and rotating said tool in engagement with a gear blank while producing a relative rolling movement between the tool and blank so timed to the tool rotation that different parts of the operating portion of the tool are in operation at different points of the roll, and indexing the blank periodically.

33. A face-mill gear cutter comprising a rotary head and a plurality of circularly arranged finish cutting blades whose cutting portions project beyond one side face of the head in the general direction of the axis of the head, said blades having opposite side cutting edges which are inclined to the axis of the cutter and which are of progressively varying height, corresponding side-cutting edges of the blades having the same profile shape and uniform positive inclination to the axis of the cutter.

34. A face-mill gear cutter comprising a rotary head and a plurality of circularly arranged finish cutting blades whose cutting portions project beyond one side face of the head in the general direction of the axis of the head, said blades having opposite side cutting edges which are inclined to the axis of the cutter and which are of progressively varying height, corresponding side-cutting edges of the blade being of same profile shape and having uniform inclination to the axis of the cutter, and said blades being of progressively varying point-width.

35. A face-mill gear cutter comprising a rotary head and a plurality of circularly arranged cutting blades whose cutting portions project beyond one side face of the head in the general direction of the axis of the head, said blades having opposite side cutting edges which are positively inclined to the axis of the cutter and which are arranged in coaxial conical surfaces, corresponding side cutting edges being of progressively varying height, and said blades being of progressively varying point-width.

36. A face-mill gear cutter comprising a rotary head and a plurality of circularly arranged cutting blades whose cutting portions project beyond one side face of the head in the general direction of the axis of the head, and said blades having opposite side-cutting edges which are of progressively varying height and which are inclined to the axis of the head and which converge in points that lie in a helix coaxial of the head, corresponding side-cutting edges of the blades being of the same profile shape and having uniform inclination to the axis of the cutter, and said blades having their tip cutting edges arranged in a helical surface.

37. A face-mill gear cutter comprising a rotary head and a plurality of circularly arranged cutting blades whose cutting portions project beyond one side face of the head in the general direction of the axis of the head, said blades having opposite side cutting edges which are of straight profile and positively inclined to the axis of the cutter and of progressively varying height and which converge in points that lie in a helix coaxial of the cutter, and said blades having their tip cutting edges arranged in a helical surface.

38. A tool for producing tapered gears comprising a rotary head and an effective cutting portion which projects beyond one side face of the head in the general direction on the axis of the head and which has opposite sides that are positively inclined to the axis of the head and lie in surfaces of revolution coaxial of the head, and which is of progressively varying height and of progressively varying point-width.

39. A tool for producing tapered gears comprising a rotary head and an effective cutting portion which projects beyond one side face of the head in the general direction of the axis of the head and which has opposite sides that are of straight profile and positively inclined to the axis of the head and lie in conical surfaces coaxial of the head, and which is of progressively varying height and of progressively varying point-width.

40. A tool for producing tapered gears comprising a rotary head and an effective cutting portion which projects beyond one side face of the head in the general direction of the axis of the head and which is arranged circularly about the axis of the head and is of progressively varying height and which has opposite sides that are of straight profile and positively inclined to the axis of the head and that lie in conical surfaces coaxial of the head and that converge in points which lie on a helix coaxial with the head.

41. A face-mill gear cutter comprising a rotary head and a plurality of roughing blades followed by a plurality of finishing blades which project beyond one side face of the head and are arranged circularly part way around the periphery of the head, the roughing blades being of progressively increasing height up the height of the first finishing blade as a limit, and the finishing blades being of progressively varying height and varying point-width, opposite side cutting edges of both the roughing and finishing blades being inclined to the axis of the cutter and converging in points which lie on a circle coaxial with the cutter.

42. A face-mill gear cutter comprising a rotary head and a plurality of roughing blades followed by a plurality of finishing blades which project beyond one side face of the head and are arranged circularly part way around the periphery of the head, the roughing blades being of progressively increasing height up to the height of the first finishing blade as a limit, and the finishing blades being of progressively varying height and progressively varying point-width, opposite side cutting edges of both the roughing and finishing blades being inclined to the axis of the cutter and converging in points which lie on the same helix coaxial of the cutter.

ERNEST WILDHABER.